United States Patent [19]
Ao et al.

[11] Patent Number: 6,109,533
[45] Date of Patent: Aug. 29, 2000

[54] AIR CONDITIONER AND REFRIGERANT HEATER OUTLET TEMPERATURE CONTROL METHOD

[75] Inventors: Takahiko Ao, Otsu; Yoshikazu Nishihara, Kouka-gun; Kuniyasu Uchiyama, Kusatsu; Kazuhito Nakatani, Yamatokoriyama; Norimasa Ishikawa, Kusatsu, all of Japan

[73] Assignee: Matsushita Electric Industrial Co., Ltd., Osaka, Japan

[21] Appl. No.: 09/159,637

[22] Filed: Sep. 24, 1998

[30] Foreign Application Priority Data

Sep. 30, 1997 [JP] Japan ................................. 9-267230

[51] Int. Cl.⁷ ............................. G05D 23/00; F25B 29/00
[52] U.S. Cl. .......................... 237/2 B; 62/228.4; 165/240
[58] Field of Search .......................... 237/2 B; 62/228.4; 165/240, 63

[56] References Cited

U.S. PATENT DOCUMENTS 5,231,845  8/1993  Sumitani et al. .................... 165/240 X
5,605,053  2/1997  Otori .................................... 62/228.4

FOREIGN PATENT DOCUMENTS 58-19663  2/1983  Japan .
58-22851  2/1983  Japan .

*Primary Examiner*—William Wayner
*Attorney, Agent, or Firm*—Wenderoth, Lind & Ponack, L.L.P.

[57] ABSTRACT

An air conditioning system includes one outdoor unit and at least one indoor unit connected to each other. The outdoor unit has a variable capacity compressor, a four-way valve, an outdoor heat exchanger, and a refrigerant heater, while the indoor unit has an indoor heat exchanger. A saturation temperature calculator computes the saturation temperature at the refrigerant heater outlet pressure. A refrigerant heater outlet temperature detection circuit detects the refrigerant temperature near the refrigerant heater outlet. A superheating calculator calculates refrigerant superheating at the refrigerant heater outlet based on values supplied thereto from the refrigerant heater outlet temperature detection circuit and saturation temperature calculator. A compressor frequency control circuit then adjusts the compressor frequency so that the calculated refrigerant superheating is maintained at a specific level.

9 Claims, 16 Drawing Sheets

Fig.3

| ΔT | FREQ. No. | |
|---|---|---|
| | COOLING | HEATING |
| +1.5 | Fcmax or Fc | 0 |
| +1.0 | 6 | 1 |
| +0.5 | 5 | 2 |
| +0.0 | 4 | 3 |
| −0.5 | 3 | 4 |
| −1.0 | 2 | 5 |
| −1.5 | 1 | 6 |
| | 0 | Fh or Fhmax |

ΔT=ROOM T.−T. SETTING
(Tr)   (Ts)

AIR CONDITIONER AND REFRIGERANT HEATER OUTLET TEMPERATURE CONTROL METHOD

BACKGROUND OF THE INVENTION

1. Field of the Invention

The present invention relates generally to an air conditioner system having one or more indoor units connected to one outdoor unit and, in particular but not exclusively, to a control method of controlling the outlet temperature of a refrigerant heater, which heats a refrigerant during heating mode operation, to maintain a balance between refrigerant heating and refrigerant circulation.

2. Description of the Related Art

Air conditioning systems include heat pump type air conditioners, which work by using heat extracted from a low temperature side on a high temperature side, and refrigerant heating type air conditioners having a refrigerant heater.

In air conditioners having a refrigerant heater it is particularly important to balance refrigerant circulation with the amount of heat added during heating mode operation. This balance, furthermore, is easily disrupted as a result of significant change in refrigerant circulation, which can occur as a result of long refrigerant lines carrying a high refrigerant charge, variation in the number of operating units, and changes in the fan output of the indoor unit. When this balance is disrupted and the heat added exceeds the heat dissipation capacity of refrigerant circulation, the outlet temperature of the refrigerant heater rises excessively. This can lead to compressor temperature problems, lubricant deterioration, exhaust gas temperature problems, and other problems. Conversely, if refrigerant circulation exceeds the heating capacity of the heater, fluid return to the compressor can occur, resulting in a drop in compressor reliability, and a rise in the input to the compressor.

Addressing this problem, Japanese Patent Publications (unexamined) 58-19663 and 58-22851 teach an air conditioning system having a bypass line from the compressor to the refrigerant heater with a bypass valve connected to the bypass line. When the load changes during heating, the bypass valve opens to return refrigerant from a refrigerant outlet of the compressor to a refrigerant inlet of the refrigerant heater, thereby controlling refrigerant circulation to adjust the load.

However, when the bypass valve is opened to return refrigerant from the refrigerant outlet of the compressor to the refrigerant inlet of the refrigerant heater, heated refrigerant that normally flows to the indoor unit is diverted to the refrigerant heater. This causes an approximately 3% drop in heating capacity, and prevents 100% of the heating capacity of the system from being delivered indoors.

In addition, providing a bypass line and bypass valve makes production more difficult, and thus increases the manufacturing cost.

SUMMARY OF THE INVENTION

The present invention has been developed to overcome the above-described disadvantages.

It is accordingly an objective of the present invention to provide an air conditioning system and refrigerant heater outlet temperature control method therefor capable of appropriately balancing refrigerant heating and refrigerant circulation to prevent an abnormal rise in the refrigerant heater outlet temperature using a simple construction by predictively controlling the outlet temperature of the refrigerant heater.

Another objective of the present invention is to provide an air conditioning system and refrigerant heater outlet temperature control method therefor capable of efficient combustion and refrigerant circulation control according to the demand load of the indoor unit.

In accomplishing the above and other objectives, the air conditioning system according to the present invention includes one outdoor unit and at least one indoor unit connected to each other by means of a refrigerant line. The outdoor unit has a variable capacity compressor, a four-way valve, an outdoor heat exchanger, and a refrigerant heater, while the indoor unit has an indoor heat exchanger. The air conditioning system also includes a saturation temperature calculating means for calculating a saturation temperature at a refrigerant heater outlet pressure, a refrigerant heater outlet temperature detection means for detecting an outlet temperature of the refrigerant heater, a refrigerant superheating calculating means for calculating refrigerant superheating at a refrigerant heater outlet based on an output of the refrigerant heater outlet temperature detection means and an output of the saturation temperature calculating means, and a compressor frequency adjustment means for adjusting a compressor frequency such that the refrigerant superheating calculated by the refrigerant superheating calculating means becomes a predetermined value.

Conveniently, the saturation temperature calculating means includes a compressor outlet temperature detection means for detecting a temperature of refrigerant output from the compressor, and predictively calculates the saturation temperature at the refrigerant heater outlet pressure by substituting the temperature detected by the compressor outlet temperature detection means into a specific equation.

Alternatively, the saturation temperature calculating means includes a compressor outlet pressure detection means for detecting a refrigerant pressure output from the compressor, and predictively calculates the saturation temperature at the refrigerant heater outlet pressure by substituting the refrigerant pressure detected by the compressor outlet pressure detection means into a specific equation.

The compressor frequency is increased in steps as the degree of superheating rises when the refrigerant superheating calculated by the refrigerant superheating calculating means exceeds the predetermined value. In contrast, the compressor frequency is decreased in steps as the degree of superheating drops when the calculated refrigerant superheating is less than the predetermined value. The compressor frequency change is controlled such that an average slope of a compressor frequency decrease is less than that of a compressor frequency increase.

Advantageously, a maximum frequency change is defined for any increase in the compressor frequency.

Again advantageously, a minimum compressor frequency is defined and determined by the temperature of refrigerant output from the compressor.

The refrigerant heater outlet temperature control method according to the present invention includes: calculating a saturation temperature at a refrigerant heater outlet pressure; detecting a refrigerant heater outlet temperature; calculating refrigerant superheating at a refrigerant heater outlet based on the calculated saturation temperature and the detected refrigerant heater outlet temperature; and adjusting a compressor frequency such that the calculated refrigerant superheating becomes a predetermined value.

Conveniently, the step of calculating the saturation temperature includes detecting a temperature of refrigerant output from the compressor, and predictively calculating the saturation temperature at the refrigerant heater outlet pressure by substituting the detected temperature into a specific equation.

Alternatively, the step of calculating the saturation temperature includes detecting a pressure of refrigerant output from the compressor, and predictively calculating the saturation temperature at the refrigerant heater outlet pressure by substituting the detected refrigerant pressure into a specific equation.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein:

FIG. 3 is a table showing temperature zone distribution of the temperature differential between room temperature and the temperature setting in the air conditioning system shown in FIG. 1;

DETAILED DESCRIPTION OF THE PREFERRED EMBODIMENTS

This application is based on an application No. 9-267230 filed Sep. 30, 1997 in Japan, the content of which is incorporated hereinto by reference.

Figure 1:
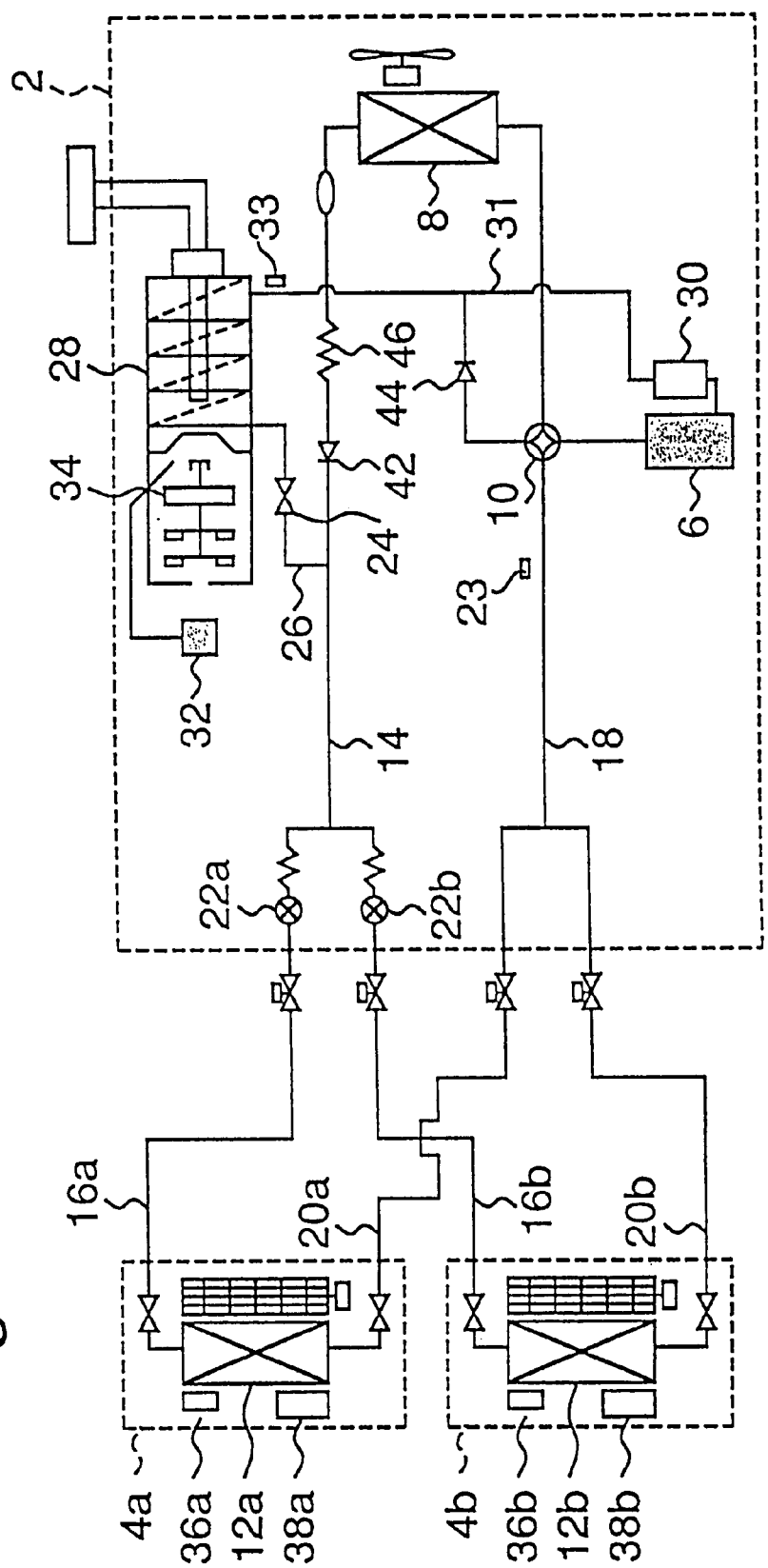
FIG. 1 is a circuit diagram showing the refrigeration cycle of an air conditioning system according to a preferred embodiment of the present invention.

FIG. 1 shows a refrigeration cycle of an air conditioning system embodying the present invention. This air conditioning system is a multi-room air conditioning system including a single outdoor unit 2 and a plurality of, for example, two, indoor units 4a and 4b connected thereto.

As shown in FIG. 1, the outdoor unit 2 includes an inverter-driven, variable capacity (frequency) compressor 6, an outdoor heat exchanger 8, and a four-way valve 10 for heating and cooling mode selection. The indoor units 4a and 4b each include an indoor heat exchanger 12a and 12b, respectively.

The outdoor unit 2 and indoor units 4a and 4b are connected by fluid distribution lines 16a and 16b and gas distribution lines 20a and 20b. The fluid distribution lines 16a and 16b branch from a primary fluid line 14 in the outdoor unit 2, and the gas distribution lines 20a and 20b branch from a primary gas line 18 in the outdoor unit 2. A pulse-controllable motor-driven expansion valve 22a and 22b, the opening of which can be adjusted by a stepping motor, for example, is installed in the fluid distribution lines 16a and 16b. A compressor outlet temperature sensor 23 for detecting the temperature of refrigerant from the compressor 6 is also disposed in the primary gas line 18.

The primary function of the compressor outlet temperature sensor 23 is to detect the high pressure saturation temperature of the compressed refrigerant. The compressor outlet temperature sensor 23 can be installed at any place between the refrigerant outlet of the compressor and the refrigerant outlet of the indoor heat exchanger in a single refrigerant heater type air conditioning system. A location as shown in FIG. 1 is preferable, however, with respect to independent control of the outdoor unit, the stability of the high pressure saturation temperature, and temperature detection at a point close to the high pressure outlet.

A refrigerant heater line 26 also branches from the primary fluid line 14 and is wound around the refrigerant heater 28. A two-way valve 24 is installed in the refrigerant heater line 26. An intake line 31 connected between the refrigerant heater outlet and an accumulator 30 connects the refrigerant heater line 26 diverging from the primary fluid line 14 to the intake side of the compressor 6. A refrigerant heater outlet temperature sensor 33 for detecting the temperature of refrigerant output from the refrigerant heater 28 is also disposed to the intake line 31.

A solenoid pump 32 and a burner motor 34 are disposed near the refrigerant heater 28. The solenoid pump 32 provides a regulated supply of fuel, and the burner motor 34 supplies air, to the refrigerant heater 28 for combustion.

The indoor units 4a and 4b each further include a room thermometer 36a and 36b for detecting the temperature of the room in which the indoor unit 4a or 4b is located, and a control circuit 38a and 38b whereby a user can control the operating mode (heating or cooling), room temperature, and on or off status of the air conditioning system.

Note that check valves 42 and 44, and a flow restrictor 46, are further provided in the outdoor unit 2.

With the refrigeration cycle configured as shown in FIG. 1, coolant from the compressor 6 during cooling mode operation is directed by the four-way valve 10 to the outdoor heat exchanger 8 whereby heat is exchanged with the outdoor air and the refrigerant is condensed. The condensed refrigerant then passes the flow restrictor 46 whereby the refrigerant pressure is reduced and the refrigerant is converted to a more easily evaporated state. The condensed, low pressure refrigerant then flows from the primary fluid line 14 into the two fluid distribution lines 16a and 16b. The motor-driven expansion valves 22a and 22b are proportionally opened using a method described further below according to the cooling requirements of the respective indoor units 4a and 4b. The low pressure refrigerant thus flows to the indoor heat exchangers 12a and 12b at a flow rate proportional to the demand, evaporates, and is returned from the gas distribution lines 20a and 20b to the primary gas line 18. The gasified refrigerant thus passes back through the four-way valve 10, through the accumulator 30, and re-enters the intake side of the compressor 6.

Note that the compressor frequency is determined by a control method described below according to the total load on the system.

When the heating mode is selected, the two-way valve 24 is closed for a known period of time. Refrigerant circulating from the check valve 42, through the outdoor heat exchanger 8, and to the check valve 44 is thus recovered by the compressor 6 in a refrigerant recovery cycle. When the refrigerant recovery cycle is completed, the two-way valve 24 opens, allowing high temperature, high pressure refrigerant from the compressor 6 to pass the four-way valve 10 and flow from the primary gas line 18 to the gas distribution lines 20a and 20b. The high temperature, high pressure refrigerant thus flows to the indoor heat exchangers 12a and 12b where it condenses to a fluid. The pressure is then reduced by the motor-driven expansion valves 22a and 22b of the fluid distribution lines 16a and 16b to an intermediate pressure.

As during cooling mode operation, the motor-driven expansion valves 22a and 22b are controlled using a method described below according to the demand of the respective indoor units 4a and 4b, and the refrigerant thus flows to the indoor heat exchangers 12a and 12b at a rate proportional to the demand load.

The intermediate pressure refrigerant is passed from the primary fluid line 14 to the refrigerant heater line 26, through the two-way valve 24, and to the refrigerant heater 28. Controlled according to a heating method described below, the refrigerant heater 28 heats the refrigerant to a specific temperature, thus converting the refrigerant to a gas which is passed back through the accumulator 30 to the intake side of the compressor 6.

Figure 2:
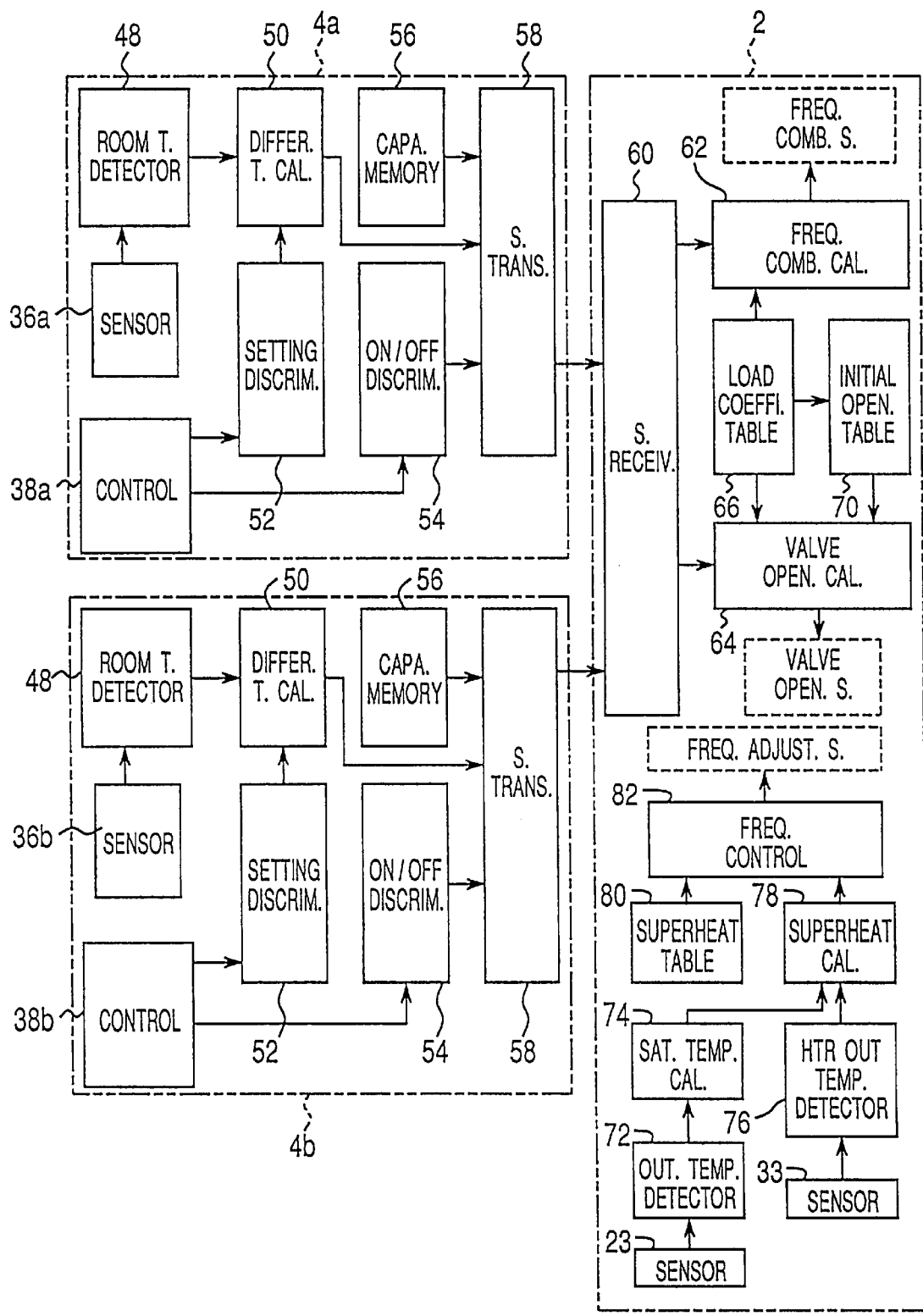
FIG. 2 is a block diagram of a control circuit in the air conditioning system shown in FIG. 1 whereby compressor frequency, combustion, and expansion valve opening are controlled.

Methods of controlling the compressor frequency, combustion, and opening of the motor-driven expansion valves, are described next below with reference to FIG. 2, a block diagram of the corresponding control circuits, and FIG. 3, a temperature zone distribution table for differential temperature $\Delta T$. Note that differential temperature $\Delta T$ is the room temperature Tr minus the temperature setting Ts.

A room temperature detection circuit 48 of one indoor unit 4a detects the temperature of the room in which the indoor unit 4a is located (simply the "room temperature" below) based on the output of the corresponding room thermometer 36a, and sends the resulting temperature signal (Tr) to a differential temperature calculator 50. Substantially concurrently, a setting discriminator 52 determines the temperature (Ts) and operating mode set by the control circuit 38a, and supplies this information to the differential temperature calculator 50. The differential temperature calculator 50 thus calculates the differential temperature $\Delta T$ (=Tr−Ts), and converts the differential temperature $\Delta T$ to a frequency number as shown in FIG. 3 to obtain the differential temperature signal.

An ON/OFF discriminator 54 determines whether the indoor unit 4a has been turned on or off by the control circuit 38a. The rated capacity of the indoor unit 4a is stored in a rated capacity memory 56.

The rated capacity signal from the rated capacity memory 56, the differential temperature signal from the differential temperature calculator 50, and the operating mode signal and on/off status signal from the ON/OFF discriminator 54, are passed by a signal transmission circuit 58 of the indoor unit 4a to a signal reception circuit 60 of the outdoor unit 2. Note that these signals are sent from each of the indoor units to the outdoor unit 2.

The signals received by the signal reception circuit 60 are selectively sent to a compressor frequency and combustion control calculator 62 and valve opening calculator 64. If there is a conflict between the selected operating modes, that is, if one indoor unit is set for heating and another is set for cooling, the operating mode selected by the indoor unit from which a signal is first received determines whether the outdoor unit 2 operates in a heating or cooling mode. The indoor unit set to a different operating mode in this case is assumed to be off, and the on/off status signal for that indoor unit is set an off state.

Based on the rated capacity signal, differential temperature signal, operating mode signal, and on/off status signal from each of the indoor units 4a and 4b, the compressor frequency and combustion control calculator 62 reads the load level coefficient for each indoor unit from a load coefficient table 66, shown as the following Table 1. The calculator 62 then multiplies the sum of the load level coefficients by a known constant and adds a compensation value to determine the frequency of the compressor 6.

TABLE 1

| Cooling, dehumidification cycle | | | | | | | | | | Fc | Fcmax |
|---|---|---|---|---|---|---|---|---|---|---|---|
| | 0 | 1 | 2 | 3 | 4 | 5 | 6 | 7 | 8 | | |
| 2.2 kw | 0 | 8 | 10 | 11 | 12 | 14 | 16 | 18 | 20 | | |
| 2.5 kw | 0 | 10 | 11 | 12 | 14 | 16 | 18 | 20 | 22 | | |
| 2.8 kw | 0 | 11 | 12 | 14 | 16 | 18 | 20 | 22 | 24 | | |
| 3.2 kw | 0 | 12 | 14 | 16 | 18 | 20 | 22 | 24 | 27 | | |
| Heating | | | | | | | | | | Fh | Fhmax |
| | 0 | 1 | 2 | 3 | 4 | 5 | 6 | 7 | 8 | | |
| 2.2 kw | 0 | 20 | 23 | 26 | 29 | 31 | 34 | 38 | 40 | | |
| 2.5 kw | 0 | 21 | 24 | 27 | 31 | 35 | 39 | 43 | 45 | | |
| 2.8 kw | 0 | 22 | 26 | 30 | 34 | 38 | 43 | 48 | 50 | | |
| 3.2 kw | 0 | 23 | 27 | 31 | 35 | 40 | 47 | 55 | 67 | | |

More specifically, the compressor frequency value (No.) obtained from the table in FIG. 3 represents the differential temperature signals of the two indoor units 4a and 4b. During cooling and dehumidification operating modes, the load level coefficients Ln1 and Ln2 are obtained from the load coefficient table 66 (Table 1) based on the supplied compressor frequency value (No.), and the total load $Ln\phi$ of the indoor units 4a and 4b is calculated. The operating frequency of the compressor 6 is set to the resulting value to regulate initial operation of the outdoor unit 2 in the cooling and dehumidification mode.

During heating mode operation, the load level coefficients Ln1 and Ln2 of the two indoor units 4a and 4b are again obtained from the load coefficient table 66 (Table 1) based on the supplied compressor frequency value (No.), and the total load $Ln\phi$ of the indoor units 4a and 4b is calculated to set the load level Lnk of the outdoor unit 2. The operating frequency of the compressor 6 is then set to this load level Lnk to regulate initial operation of the outdoor unit 2 in the heating mode.

The following equations are used to calculate the control values during cooling and dehumidification, and heating, modes.

A. Control Equations for Cooling and Dehumidification

1) Single room operation $Ln\phi = a1 \times Ln1 + b1$, or $Ln\phi = a1 \times Ln2 + b1$ 2) 2-room operation if $Ln1 + Ln2 < 34$ $Ln\phi = a1 \times (Ln1 + Ln2) + b1$     (i)

if $Ln1 + Ln2 \geq 34$ $Ln\phi = a2 \times (Ln1 + Ln2) + b2$     (ii)

where a1>a2, and b1<b2.

The operating frequency of he compressor 6 is set to the value of $Ln\phi$ obtained by the appropriate equation above (Comp Hz=$Ln\phi$).

B. Control Equations for Heating

1) Single room operation $Ln\phi = a3 \times Ln1 + b3$, or $Ln\phi = a3 \times Ln2 + b3$ 2) 2-room operation $Ln\phi = a4 \times (Ln1 + Ln2) + b4$ where a3>a4, and b3<b4, The resulting value of $Ln\phi$ is then substituted for Lnk, and the operating frequency of the compressor 6 is set to the value of Lnk.

Lnk=$Ln\phi$

Comp Hz=Lnk

Note that the values of a1 to a4, and b1 to b4, above are experimental values determined according to the capacity of the compressor 6, refrigerant line size, and other variable parameters.

Figure 4:
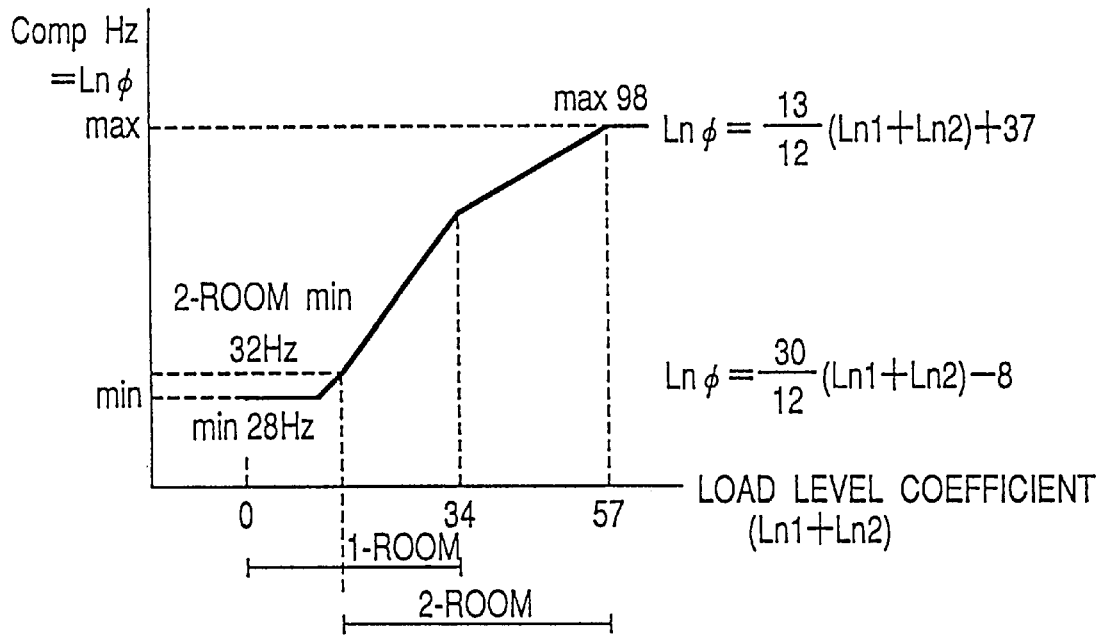
FIG. 4 is a graph showing the results of a control equation used for determining the compressor frequency during cooling and dehumidification mode operation in the air conditioning system shown in FIG. 1.
Figure 5:
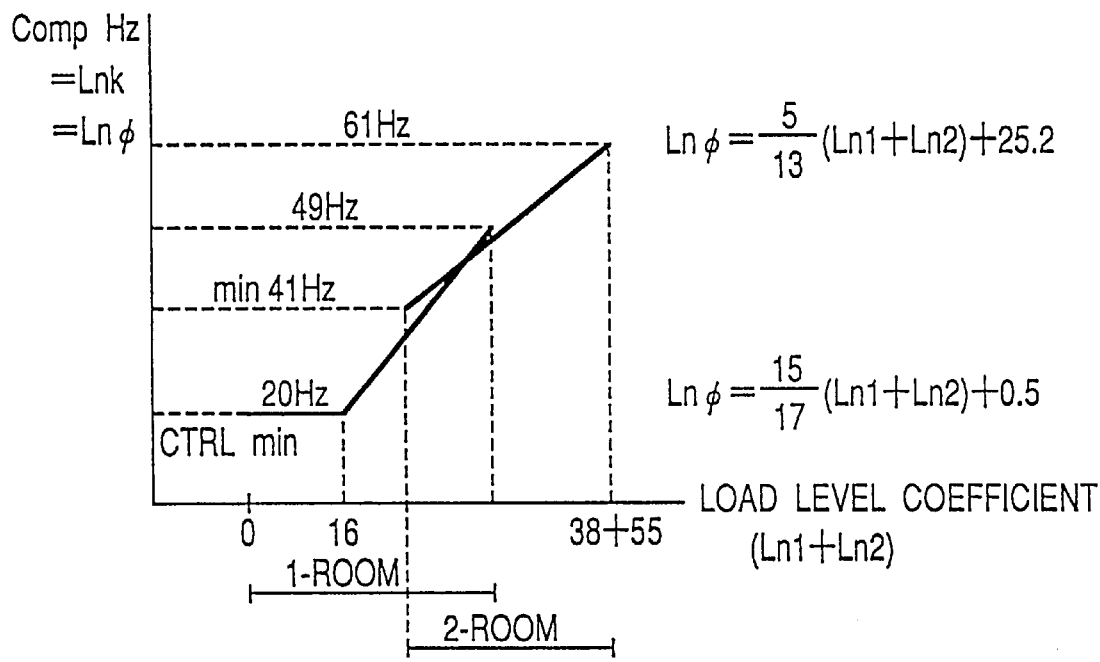
FIG. 5 is a graph showing the results of a control equation used for determining the compressor frequency during heating mode operation in the air conditioning system shown in FIG. 1.

Results obtained from the above equations are graphed in FIG. 4 and FIG. 5 where the following values were used in the calculations.

a1=30/12 b1=−8 a2=13/12 b2=37 a3=15/17 b3=0.5 a4=5/13 b4=25.2

As shown in FIG. 4, the minimum operating frequency to which the compressor 6 can be set during single room, cooling/dehumidification mode operation is 28 Hz. During two-room operation, the minimum operating frequency is 32 Hz, a level at which low frequency protection does not operate. The maximum operating frequency is 98 Hz.

As shown in FIG. 5, the minimum operating frequency to which the compressor 6 can be set during single and two room, heating mode operation is 20 Hz and 41 Hz, respectively. The maximum operating frequency in these modes is 49 Hz and 61 Hz, respectively.

Exemplary signals from the indoor units 4a and 4b are shown in Table 2 and described below.

TABLE 2

| Indoor unit | Op. mode | ON/OFF signal | Rated cap. | Freq. No. |
|---|---|---|---|---|
| 4a | heating | on | 2.2 kW | 6 |
| 4b | heating | on | 2.5 kW | 4 |

From Table 1 and Table 2, the load level coefficients Ln1 and Ln2 of the indoor units 4a and 4b are 34 and 31, respectively. The frequency Hz of the compressor 6 is therefore Hz=$Ln\phi$=5/13×(34+31)+25.2≈50.

The result of this calculation is converted to a frequency signal sent to a compressor drive circuit (not shown) for frequency control of the compressor 6. The compressor frequency and combustion control calculator 62 thereafter regularly repeats the above calculations based on the rated capacity signal, differential temperature signal, operating mode signal, and on/off status signal from each of the indoor units 4a and 4b, corrects the result as required, and sends the corrected value to the compressor drive circuit as the frequency signal used for frequency control of the compressor 6.

As described above, the frequency of the compressor 6 is determined using a specific calculation method according to the number of operating indoor units. During low frequency operation with a single indoor unit, low input load operation is thus possible by driving the compressor 6 at a low operating frequency. As the total load increases, the operating frequency of the compressor 6 can be increased to compensate for pressure loss from the refrigerant lines, thereby assuring high refrigerant circulation and high efficiency operation. When two or more indoor units are operating in the heating mode, the compressor 6 must be driven at a higher frequency even if the total indoor demand is the same as that with single indoor unit operation in order to compensate for the increased volume of the lines carrying the refrigerant. However, line pressure loss increases significantly with single indoor unit operation after a certain point, and a higher compressor frequency is therefore required with single indoor unit operation.

The expansion valve opening is determined in a manner similar to that described above by the expansion valve opening calculator 64. That is, a load level coefficient is selected from load coefficient tables 66 (Table 3 below) based on the rated capacity signal, differential temperature signal, operating mode signal, and on/off status signal output by each of the indoor units 4a and 4b, and an initial valve opening value is then read from an initial valve opening table 70 (Table 4 below) based on the rated capacity of the indoor units 4a and 4b. Note that the initial valve opening is determined so that each indoor unit can be controlled to exhibit a predetermined performance even when indoor units of different rated capacities are used in combination.

TABLE 3

| Cooling dehumidification cycle | | | | | | | | Fc | Fcmax |
|---|---|---|---|---|---|---|---|---|---|
| P0-value | 0 | 1 | 2 | 3 | 4 | 5 | 6 | 7 | 8 |
| 2.2 kw | shut | 0.7 | 0.8 | 0.8 | 0.85 | 0.85 | 0.95 | 1.0 | 1.2 |
| 2.5 kw | shut | 0.7 | 0.8 | 0.8 | 0.85 | 0.85 | 0.95 | 1.0 | 1.2 |
| 2.8 kw | shut | 0.7 | 0.8 | 0.8 | 0.85 | 0.85 | 0.95 | 1.0 | 1.2 |
| 3.2 kw | shut | 0.7 | 0.8 | 0.8 | 0.85 | 0.85 | 0.95 | 1.0 | 1.2 |
| Heating | | | | | | | | Fh | Fhmax |
| P0-value | 0 | 1 | 2 | 3 | 4 | 5 | 6 | 7 | 8 |
| 2.2 kw | shut | 0.8 | 0.85 | 0.85 | 0.9 | 0.95 | 1.0 | 1.1 | 1.2 |
| 2.5 kw | shut | 0.8 | 0.85 | 0.85 | 0.9 | 0.95 | 1.0 | 1.1 | 1.2 |
| 2.8 kw | shut | 0.8 | 0.85 | 0.85 | 0.9 | 0.95 | 1.0 | 1.1 | 1.2 |
| 3.2 kw | shut | 0.8 | 0.85 | 0.85 | 0.9 | 0.95 | 1.0 | 1.1 | 1.2 |

Note that P0-value is the load level coefficient, and "shut" indicates the valve is completely closed.

TABLE 4

| | Initial opening (pulses) | |
|---|---|---|
| | Cool/dehumidify | Heat |
| 2.2 kw | 180 | 350 |
| 2.5 kw | 230 | 380 |
| 2.8 kw | 280 | 420 |
| 3.2 kw | 350 | 480 |

The opening of expansion valves 22a and 22b is determined as the product of the respective load level coefficient and the initial valve opening as shown in the following equation $$\text{valve opening} = P0 \times \text{initial pulse count}$$

where P0 is the load level coefficient and the initial pulse count is the value obtained from Table 4.

In the above example, the load level coefficients of the indoor units 4a and 4b are 1.0 and 0.9, and the respective initial valve opening counts are 350 and 380. The valve openings for the expansion valves 22a and 22b are thus 350 and 342. The resulting valve opening values are then applied as an expansion valve opening signal to the respective valve drive circuits (not shown).

The actual physical openings of the expansion valves 22a and 22b are thus regulated by driving the respective valve motors 350 and 342 pulses. The valve opening is thereafter recalculated for each valve at a regular period using the method described above, the calculated results are corrected as required, and the corrected value is applied as an expansion valve opening signal to the expansion valve drive circuit.

Problems unique to heating mode combustion control in the above multi-room air conditioning system are described immediately below.

When operating in the heating mode, the refrigerant outlet temperature of the refrigerant heater 28 is balanced based on the temperature (combustion) of the refrigerant heater 28 and the refrigerant temperature in the refrigerant lines (refrigerant circulation). If combustion (refrigerant heater temperature) is high relative to refrigerant circulation, the refrigerant outlet temperature will rise; if combustion is low relative to circulation, the refrigerant outlet temperature will drop. Why this occurs in a multi-room air conditioning system is described below.

As individual indoor units are operated (turned on and off, or the operating mode changes), there can be a significant change in the total effective length of the refrigerant lines carrying refrigerant at any particular time. Refrigerant circulation can therefore change significantly, producing significant variation in the refrigerant outlet temperature of the refrigerant heater.

The large amount of refrigerant required to charge the system means the amount of refrigerant to be heated changes significantly as the indoor units are operated. This change in the amount of circulating refrigerant subtly affects refrigerant heater temperature.

Compared with a single-room air conditioning system, there is a greater change in the refrigeration cycle at maximum operating capacity. Precise temperature control is also required at minimum operating capacity, the balance between combustion and refrigerant circulation during refrigeration cycle control is easily disrupted, and the refrigerant temperature can thus vary widely.

The following problems can arise as a result of a rise or drop in the refrigerant outlet temperature.

(i) When the refrigerant outlet temperature rises
  Performance drops (heat exchanger efficiency drops)
  As the temperature rise increases, the refrigerant heater and compressor are turned off to protect them against damage. This leads to shortened heater and relay life due to repeatedly turning the burner on and off, as well as reduced comfort.
  When the temperature rises abnormally, the refrigeration cycle oil carbonizes, impairing compressor lubrication, and leading to compressor damage. The aluminum housing of the refrigerant heater, and the copper tubing wound to the refrigerant heater, can also become deformed and damaged.

The exhaust gas temperature rises.

(ii) When the refrigerant outlet temperature drops

A drop in refrigerant superheating results in compressor fluid compression (fluid return), which in turn causes abnormal shaft wear.

Condensation forms in the refrigerant heater. This condensation mixes with sulfur oxide by-products from combustion, forming sulfuric acid, which corrodes aluminum.

The input load rises.

To avoid the above-noted problems, combustion is controlled by the method described below in a multi-room air conditioning system according to the present invention.

The frequency value (No.) of the compressor 6 is set by each indoor unit 4a and 4b based on the difference between the intake temperature and the temperature setting of the indoor unit, and is output to the outdoor unit 2.

The outdoor unit 2 derives the load level coefficients Ln1 and Ln2 from a performance ranking of the indoor units 4a and 4b, and the frequency value (No.), and the total load Lnϕ is calculated. The total load Lnϕ is then substituted for load level Lnk, and the preferred combustion level (K) is calculated from the following equations to determine the operating load level of the outdoor unit.

Calculating the preferred combustion level (K)

1) With one indoor unit operating $$K=-(256-K1_{max})/(Lnk1_{max}-Lnk1_{min})\times(Lnk-Lnk1_{min})+256$$

2) With two indoor units operating $$K=-K2_{min}/(Lnk2_{max}-Lnk2_{min})\times(Lnk-Lnk2_{min})+K2_{min}$$

where $K1_{max}$, $K2_{min}$, $Lnk1_{min}$, $Lnk1_{max}$, $Lnk2_{min}$, and $Lnk2_{max}$ are defined as follows:

$K1_{max}$: 69

$K2_{min}$: 145

$Lnk1_{min}$: 20

$Lnk1_{max}$: 42

$Lnk2_{min}$: 42

$Lnk2_{max}$: 61.

Figure 6:
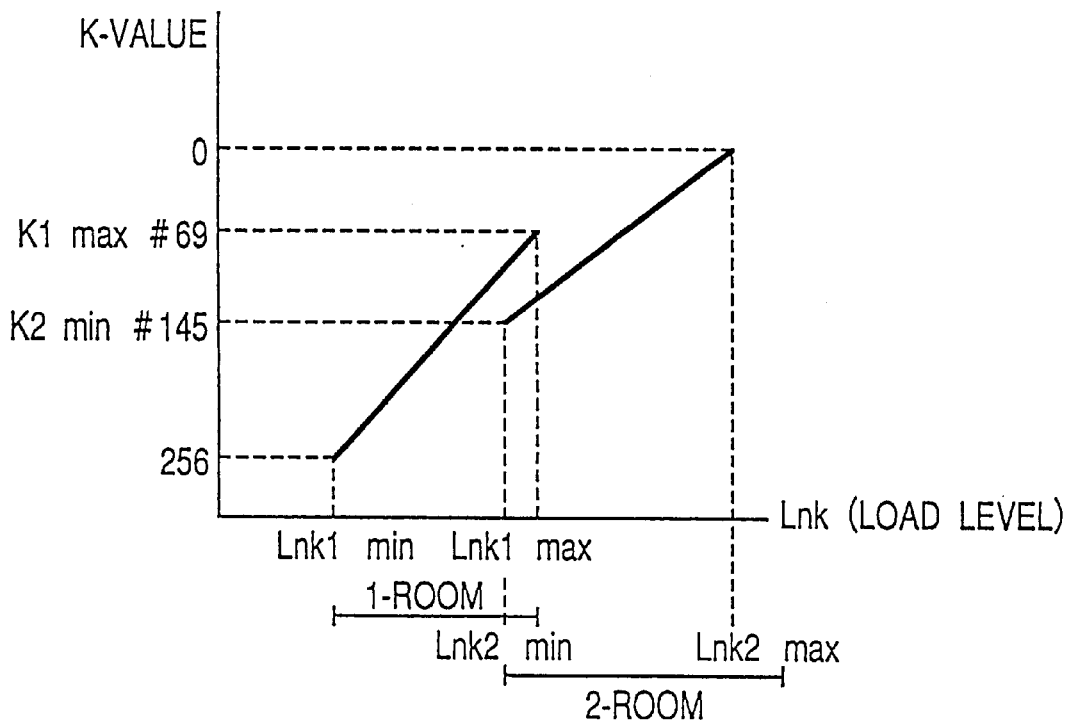
FIG. 6 is a graph showing the results of a control equation used for determining the combustion level (K) during heating mode operation in the air conditioning system shown in FIG. 1.
Figure 7:
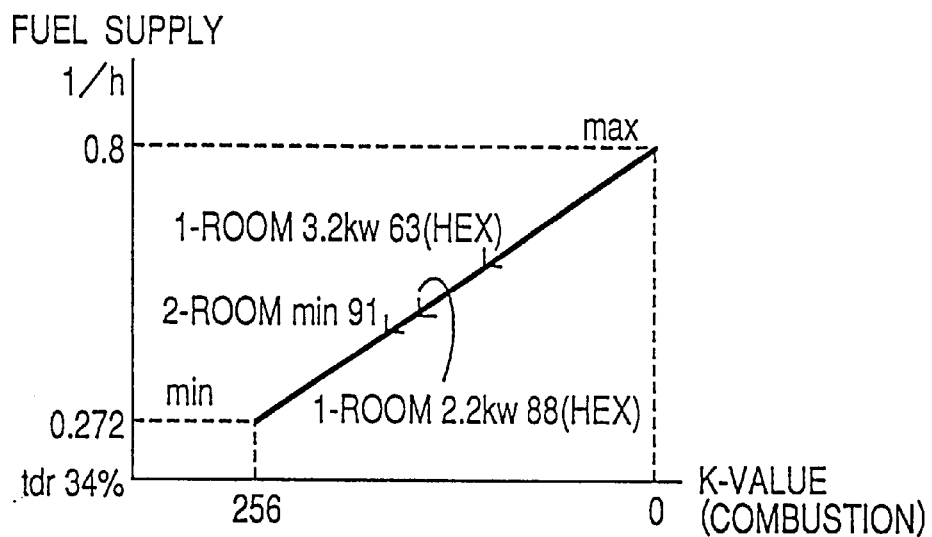
FIG. 7 is a graph showing the relationship between the combustion level (K) determined from FIG. 6 and the fuel supply in the air conditioning system shown in FIG. 1.

The above control equation is graphed in FIG. 6. Note that the preferred combustion level (K) for the indicated refrigerant circulation is determined with consideration for the fuel supply as shown in FIG. 7, for example. That is, when the preferred combustion level (K) is calculated, the solenoid pump 32 frequency and burner motor 34 speed settings are initialized according to the resulting value of K to appropriately set and regulate the fuel supply and air supply. The expansion valves 22a and 22b linked to the indoor units 4a and 4b are also initialized based on the frequency values (No.) output from the indoor units 4a and 4b, that is, the compressor frequency is controlled using the same method used in the cooling mode. It should be noted that the combustion level can be determined in a manner similar to the determination of the compressor frequency.

Note, further, that the relationship between the maximum combustion level with single room operation, and the minimum combustion level with two-room operation, is defined such that, insofar as the compressor frequency remains the same, the combustion level is higher for the configuration having fewer operating indoor units. This is because refrigerant line pressure loss is greater relative to refrigerant circulation with single room operation, and combustion must therefore be greater with single room operation at a particular compressor frequency.

By thus controlling the compressor frequency according to the total required demand from all rooms, and determining the opening of the individual expansion valves 22a and 22b according to the load from each room, using the control method described above, the required heating or cooling capacity can be delivered as required to each room.

It is therefore possible to improve room comfort and reduce energy consumption while precisely and optimally controlling the refrigeration cycle.

A preferred method of controlling a variable number of operating units is described next below with reference to a flow chart in FIG. 8 and a timing chart in FIG. 9. It is assumed by way of example below that one of the two indoor units 4a and 4b is initially operating in the heating mode, and at some later point the other unit also begins operating in the heating mode.

The rooms in which the indoor units 4a and 4b are located are designated room A and room B, respectively. At first, only the indoor unit 4a of room A is operating in the heating mode. The other indoor unit 4b in room B then starts operating in the heating mode. Immediately after indoor unit 4b starts, the expansion valve 22b corresponding to room B is opened so that the refrigerant flows to both indoor unit 4a in room A and indoor unit 4b in room B. Refrigerant flow to the refrigerant heater 28 therefore drops. As a result, the balance between refrigerant heating and refrigerant circulation is disrupted, creating the potential for an abnormal rise in the refrigerant outlet temperature of the refrigerant heater 28.

Figure 8:
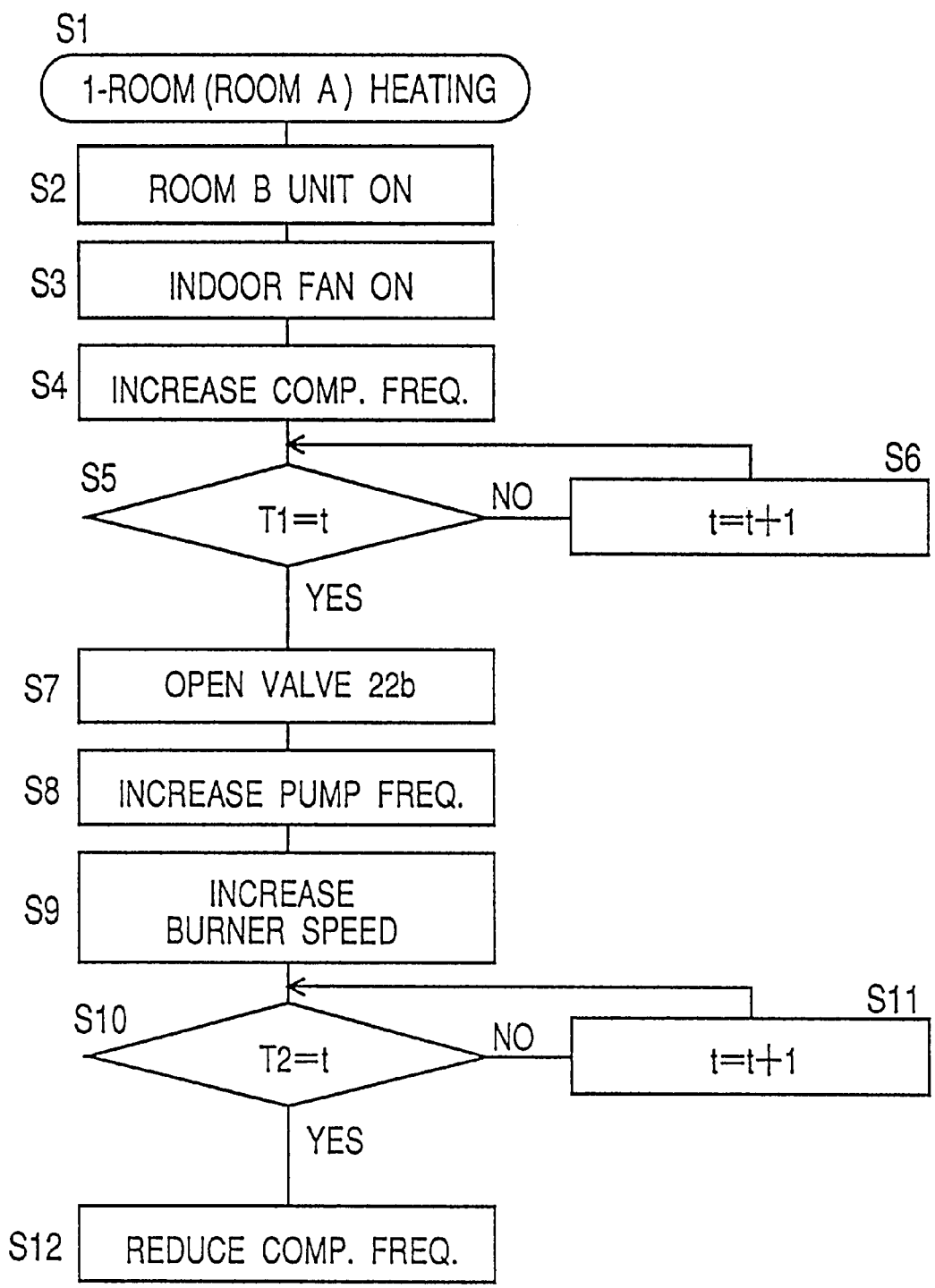
FIG. 8 is a flow chart used to describe the control process implemented when one indoor unit is operating in a heating mode, and a second indoor unit is then turned on, in the air conditioning system shown in FIG. 1.

Referring to the flow chart in FIG. 8, operation starts with the indoor unit 4a of room A operating in the heating mode (step S1). To avoid the above abnormal temperature rise when a heating mode operating signal is received for the indoor unit 4b in room B (step S2), the fan of the indoor unit 4b is turned on (step S3), and refrigerant circulation is increased (step S4) by gradually increasing the compressor frequency to a predefined high frequency setting (61 Hz in this example) or to a frequency level calculated based on the room load. Elapsed time counters T1 and T2 for tracking the time from receipt of the operating signal are also initialized and begin incrementing.

When elapsed time T1 reaches a specific time t, which is 30 seconds in the present embodiment (steps S5 and S6), the expansion valve 22b for the room B indoor unit 4b is opened (step S7). The solenoid pump 32 frequency and burner motor 34 speed are then gradually increased (steps S8 and S9) to gradually increase refrigerant heater 28 combustion.

It should be noted that the rate of increase in the solenoid pump 32 frequency and burner motor 34 speed is controlled to less than the rate of increase in the compressor 6 frequency to prevent an abnormal rise in the refrigerant temperature. It should also be noted that combustion can be increased simultaneously to or slightly delayed from opening of the expansion valve 22b. However, if combustion is increased before the expansion valve 22b is opened, an abnormal rise in the refrigerant outlet temperature of the refrigerant heater 28 is an obvious danger.

When the elapsed time T2 from receipt of the operating signal increments to a second specific time t, which in this example is 180 seconds (steps S10 and S11), the compressor frequency is reduced in steps to a value determined from the room load (step S12).

Figure 9:
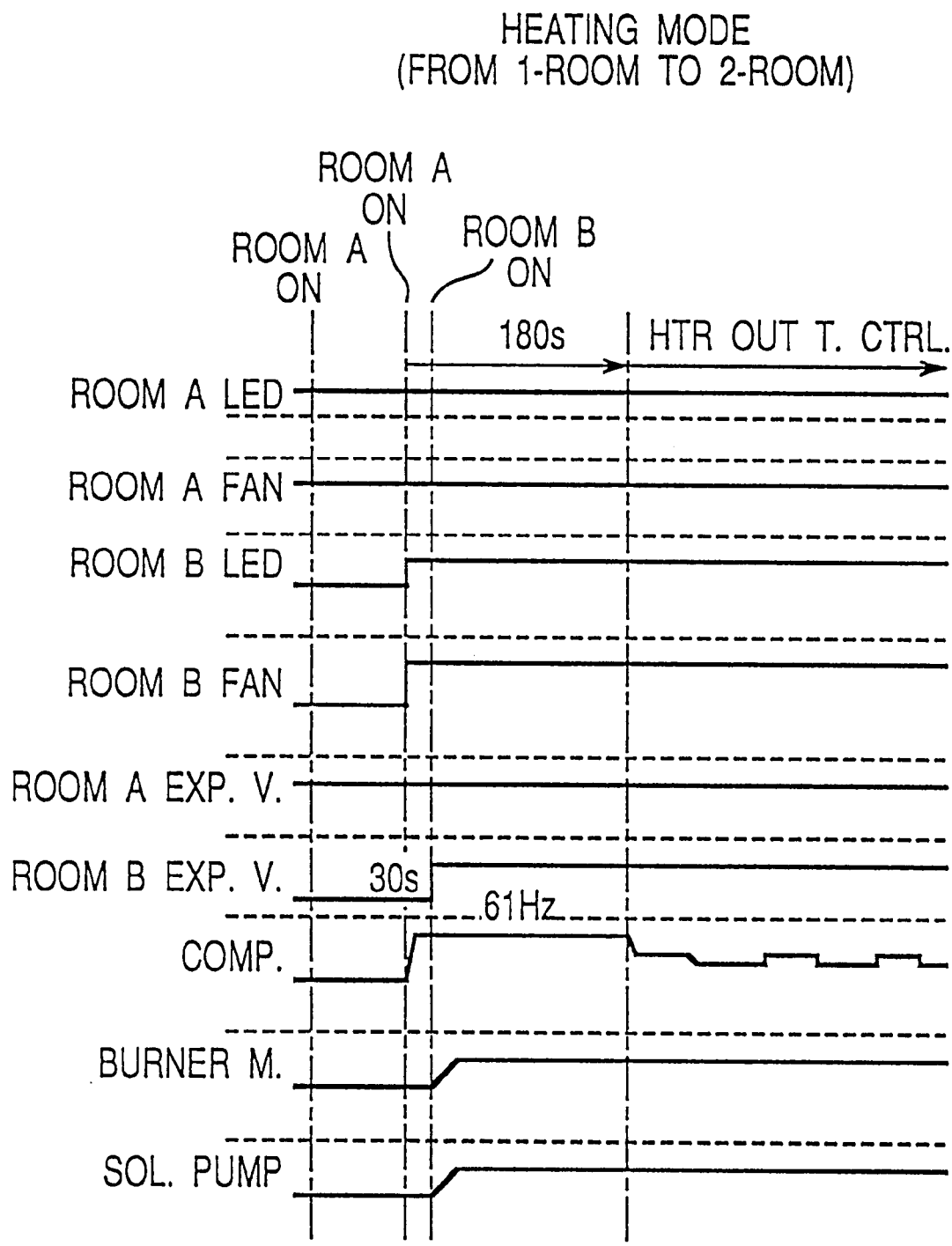
FIG. 9 is a timing chart used to describe the control process implemented when one indoor unit is operating in a heating mode, and a second indoor unit is then turned on, in the air conditioning system shown in FIG. 1.

It should be noted that increasing the compressor frequency and operating the indoor unit fan are shown as occurring simultaneously in the flow chart in FIG. 8 and the timing chart in FIG. 9. It is certainly possible, however, to delay fan operation for a specific period from when the compressor frequency is increased. Refrigerant heater combustion is also described as increasing gradually and continuously, but this process can be modified to increase in discrete steps. In this case, the average rate of increase in combustion must be set to less than the rate of increase in the compressor frequency.

A further preferred method of controlling a variable number of operating units is described next below with reference to a flow chart in FIG. 10 and a timing chart in FIG. 11. In this case it is assumed by way of example that the two indoor units 4a and 4b are both operating in the heating mode, and at some later point one of the two units, specifically indoor unit 4b in the following example, is turned off.

Figure 10:
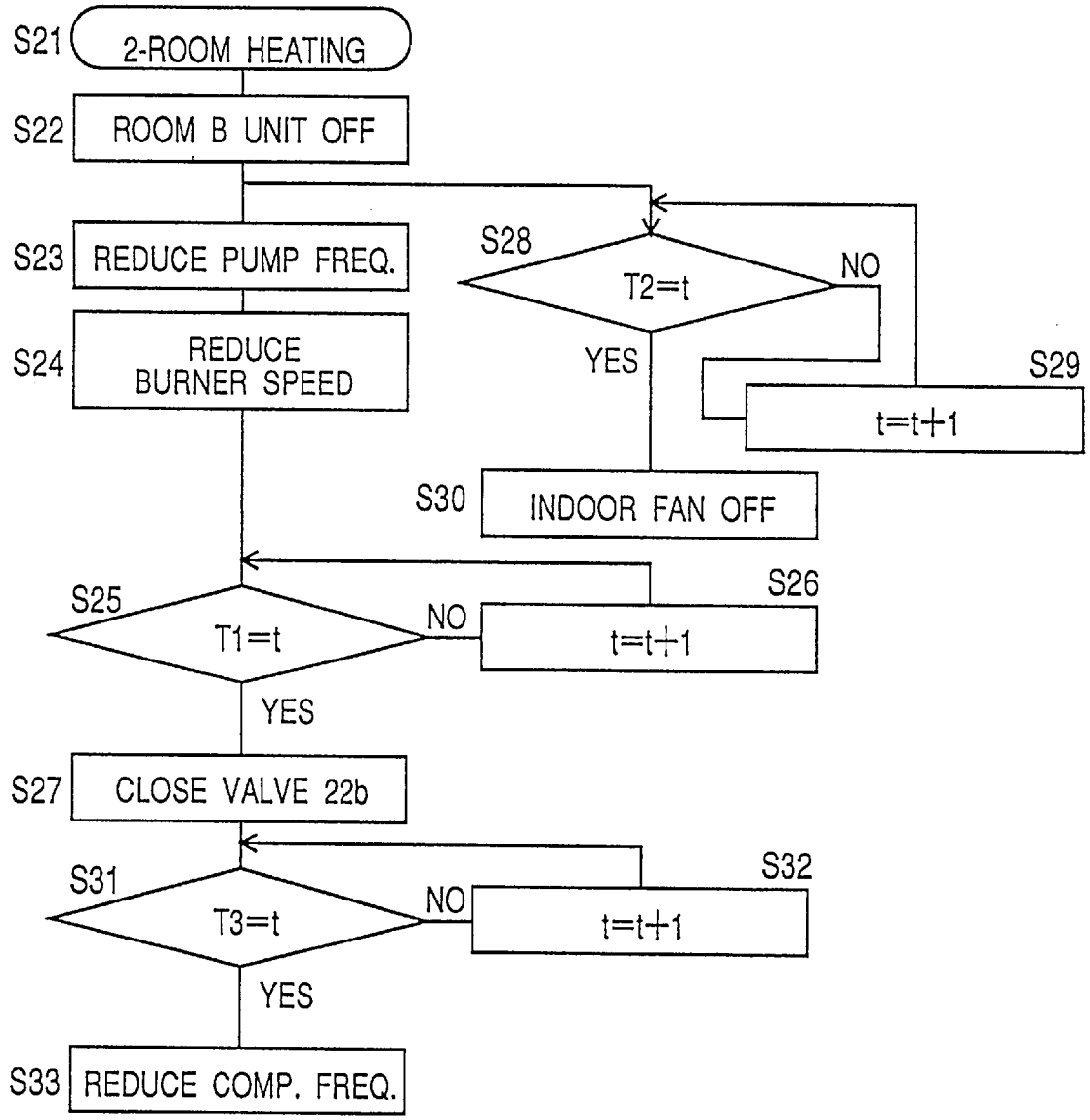
FIG. 10 is a flow chart used to describe the control process implemented when two indoor units are operating in a heating mode, and one indoor unit is then turned off, in the air conditioning system shown in FIG. 1.

Referring now to the flow chart in FIG. 10, operation starts with both indoor units 4a and 4b operating in the heating mode (step S12). When a signal indicating that the indoor unit 4b is turned off (step S22) is then received, elapsed time counters T1, T2 and T3 for tracking the time from receipt of the stop (off) signal are initialized and begin incrementing. Refrigerant heater 28 combustion is also reduced by gradually reducing the solenoid pump 32 frequency and burner motor 34 speed (steps S23 and S24).

When elapsed time T1 reaches a specific time t, which is 60 seconds in the present embodiment (steps S25 and S26), the expansion valve 22b for the room B indoor unit 4b is gradually closed (step S27).

When elapsed time T2 reaches a specific time t, which is 90 seconds in the present embodiment (steps S28 and S29), the fan of the indoor unit 4b is turned off (step S30).

When elapsed time T3 reaches a specific time t, which is 210 seconds in the present embodiment (steps S31 and S32), the compressor frequency is reduced (step S33) in discrete steps to a specific calculated value. This value is calculated by the compressor frequency and combustion control calculator 62 based on the total demand load of the rooms. By thus decreasing refrigerant circulation, the balance between refrigerant heating and refrigerant circulation is maintained, and an abnormal rise in the refrigerant outlet temperature of the refrigerant heater 28 can be prevented.

It should be noted that the delay time between receiving the stop (off) signal and actually stopping the indoor unit fan depends on the heat capacity of the burner. It therefore follows that this delay time must be increased if the heat capacity of the burner is high.

Data obtained as a result of varying the number of operating indoor units in a multi-room air conditioning system according to the present invention are graphed in FIG. 12 to FIG. 15. Data obtained when switching from one indoor unit operation to two indoor unit operation are graphed in FIG. 12 and FIG. 13, and data obtained when switching from two indoor unit operation to one indoor unit operation are graphed in FIG. 14 and FIG. 15.

Figure 12:
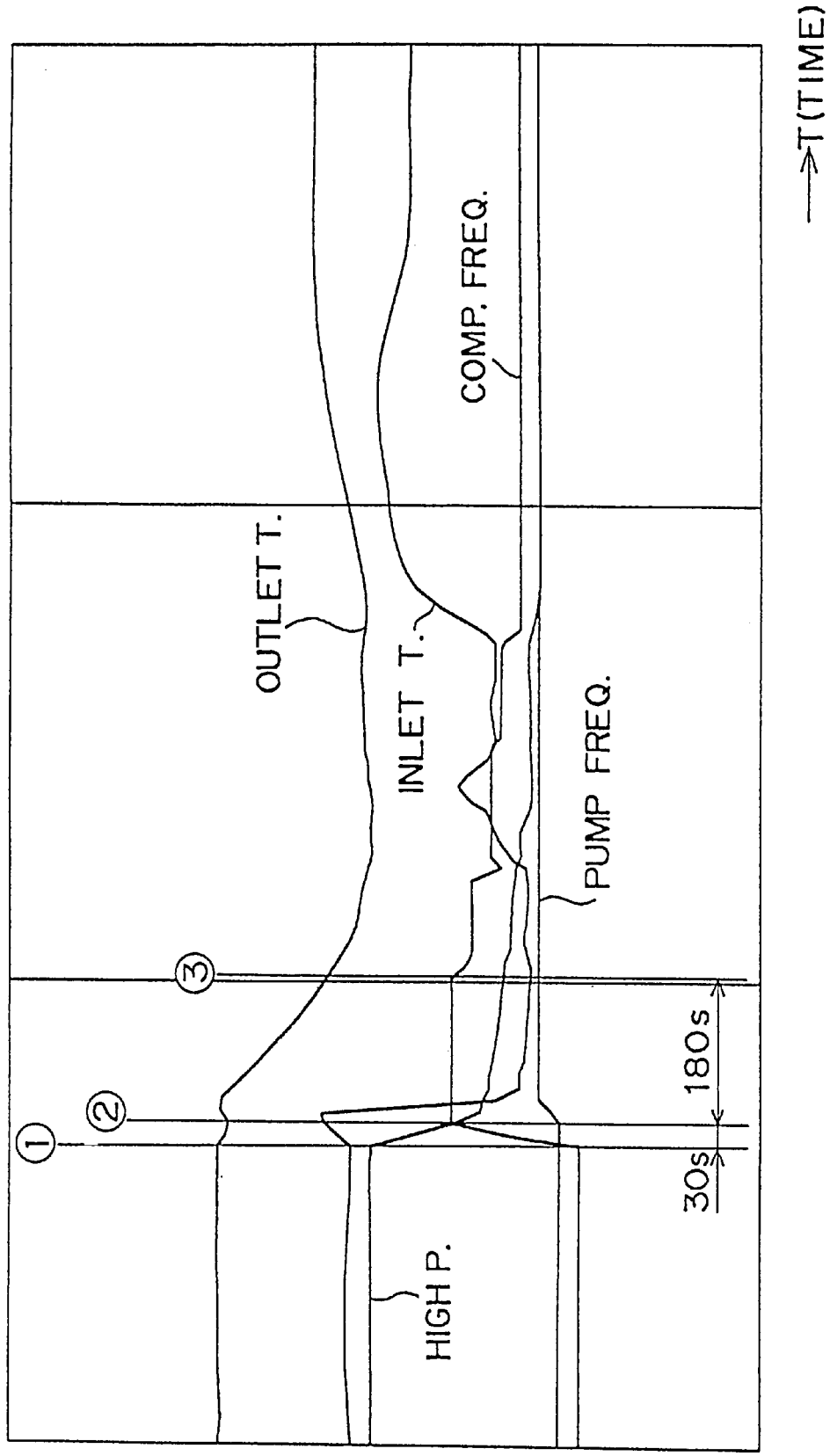
FIG. 12 is a graph showing the changes in various parameters resulting from a significant change in the high pressure level of the refrigerant when one indoor unit is operating, and a second indoor unit is then turned on, in the air conditioning system shown in FIG. 1.

More specifically, the data graphed in FIG. 12 were obtained when an indoor unit with a 2.2 kW rated capacity was turned on while an indoor unit with a 3.2 kW capacity was already running. The compressor frequency, preferred combustion level (K), and other specific parameters changed as follows.

(1) When the 2.2 kW unit was turned on at time T (1) in FIG. 12, and the 3.2 kW unit fan was on HIGH, compressor frequency went from 36 Hz to 61 Hz.

(2) By time T (2), the expansion valve of the 2.2 kW unit opened from an 80 to a 350 pulse equivalent, and combustion (K) dropped from 98 to 80.

(3) By time T (3), compressor frequency went from 61 Hz to 54 Hz.

When operation changed from single room to two room operation, there was a significant change (drop) in the compressor outlet pressure, which directly affects refrigerant circulation, between time points (1) and (2) as shown in FIG. 12. However, by increasing the compressor frequency to 61 Hz, and further opening the expansion valve for the newly started indoor unit after a slight delay, the solenoid pump frequency and combustion are gradually increased. The balance between refrigerant circulation and combustion is thus not noticeably disturbed. While there is also a slight drop in both the inlet temperature (refrigerant heater outlet temperature) and outlet temperature of the compressor, the drop is not significant.

Figure 13:
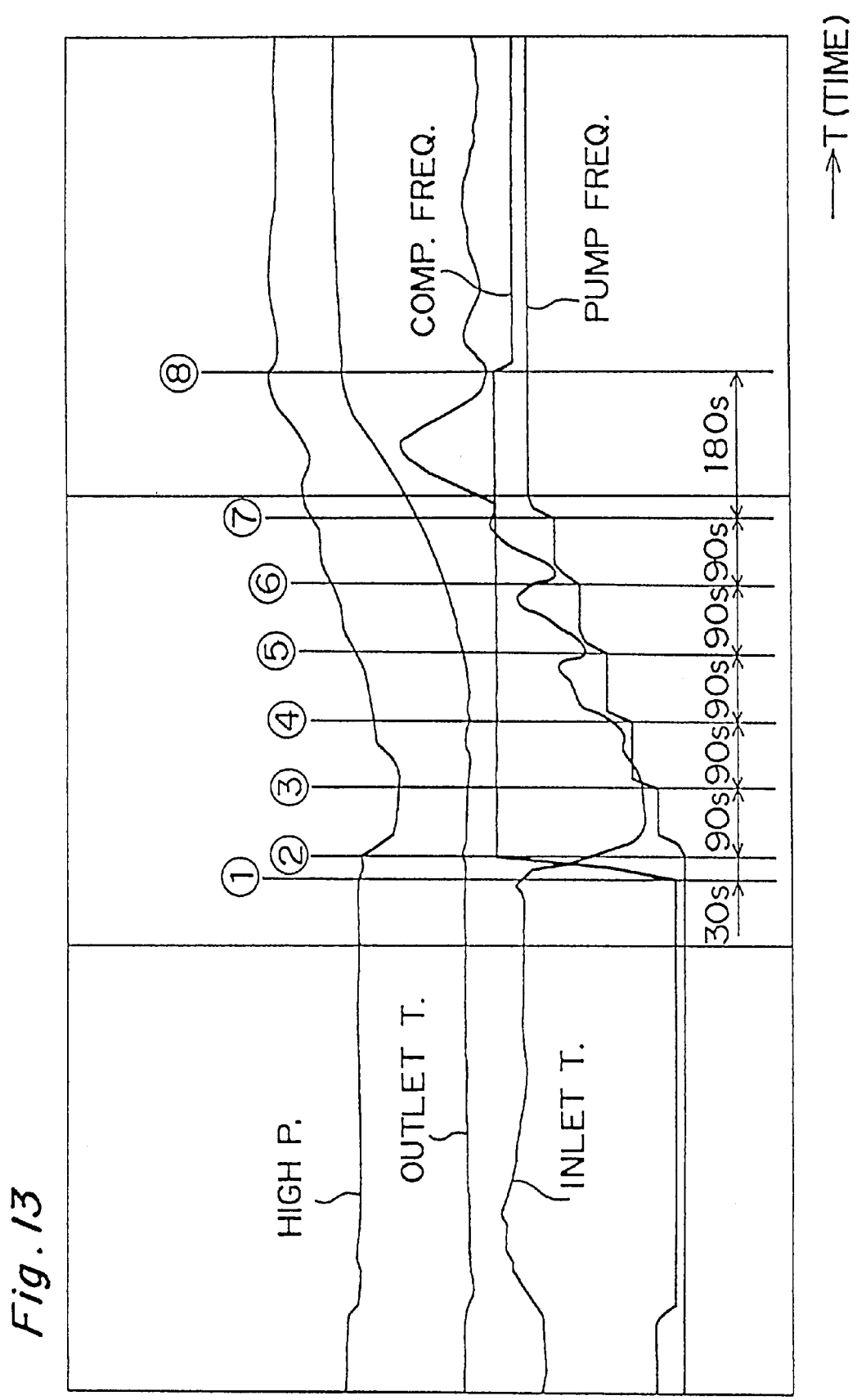
FIG. 13 is a graph showing the changes in various parameters resulting from a significant change in the combustion level of the refrigerant heater when one indoor unit is operating, and a second indoor unit is then turned on, in the air conditioning system shown in FIG. 1.

Results obtained when the 2.2 kW indoor unit was operating and a separate 3.2 kW indoor unit was then turned on are graphed in FIG. 13. The compressor frequency, preferred combustion level (K), and other specific parameters are again shown below.

(1) At time T (1), the 3.2 kW unit turned on, and compressor frequency went from 24 Hz to 61 Hz.

(2) At time T (2), the expansion valve opening of the 3.2 kW unit opened from an 80 to a 480 pulse equivalent.

(2)–(7) From time T (2) to (7), combustion (K) decreased in steps to K=40.

As shown in FIG. 13, a significant change in combustion can be achieved by increasing the solenoid pump frequency in discrete steps. However, there is not a significant change in the high pressure, nor is a significant change in either the intake temperature or outlet temperature observed. This is because before the solenoid pump frequency is increased, the compressor frequency is increased to 61 Hz, and then the opening of the expansion valve for the indoor unit that was just turned on is appropriately adjusted.

Figure 14:
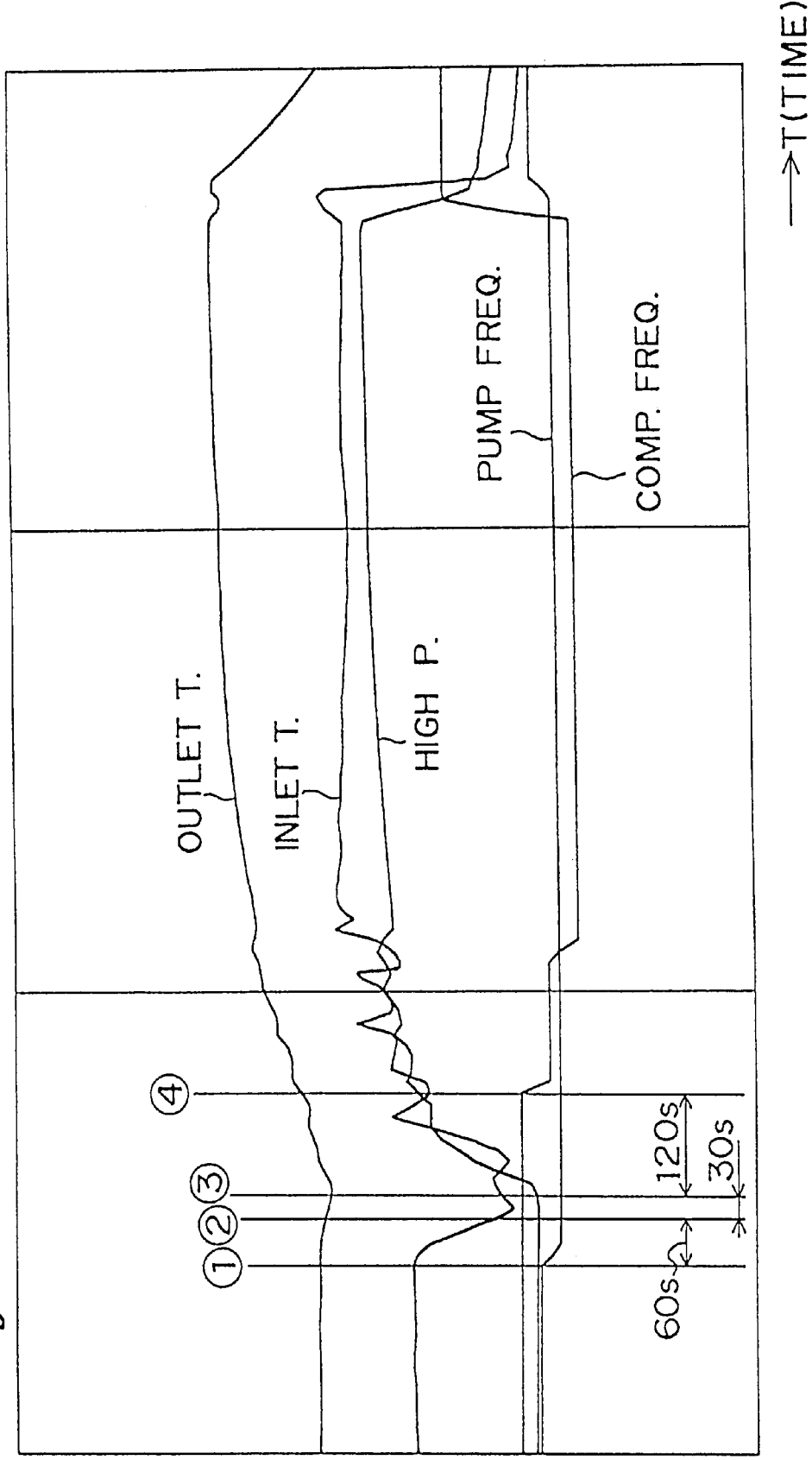
FIG. 14 is a graph showing the changes in various parameters resulting from a significant change in the high pressure level of the refrigerant when two indoor units are operating, and one indoor unit is then turned off, in the air conditioning system shown in FIG. 1.

Results obtained when both the 2.2 kW and 3.2 kW indoor units were operating, and the 2.2 kW unit was then turned off, are graphed in FIG. 14. The compressor frequency, preferred combustion level (K), and other specific parameters are again shown below.

(1) At time T (1), combustion K changed from 80 to 98.

(2) At time T (2), the 2.2 kW unit valve opening closed from a 350 to an 80 pulse equivalent.

(3) At time T (3), the 2.2 kW unit turned off, and the 3.2 kW unit fan switched to low.

(4) At time T (4), compressor frequency dropped from 48 Hz to 42 Hz.

Figure 11:
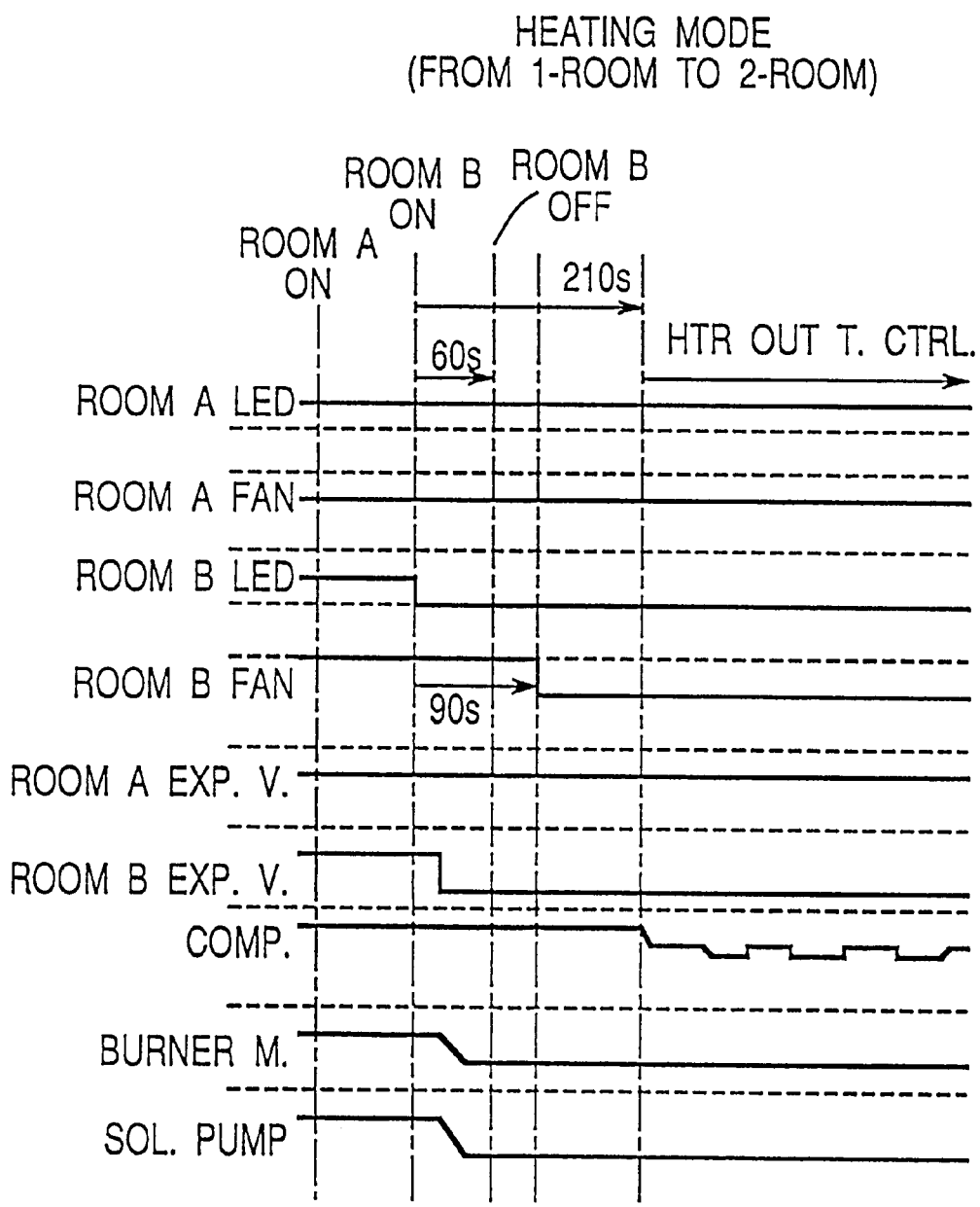
FIG. 11 is a timing chart used to describe the control process implemented when two indoor units are operating in a heating mode, and one indoor unit is then turned off, in the air conditioning system shown in FIG. 1.

While there is a significant change in the high pressure in this case as shown in FIG. 14, a sudden change in the intake temperature and outlet temperature can be prevented by controlling the system components based on the timing chart shown in FIG. 11.

Figure 15:
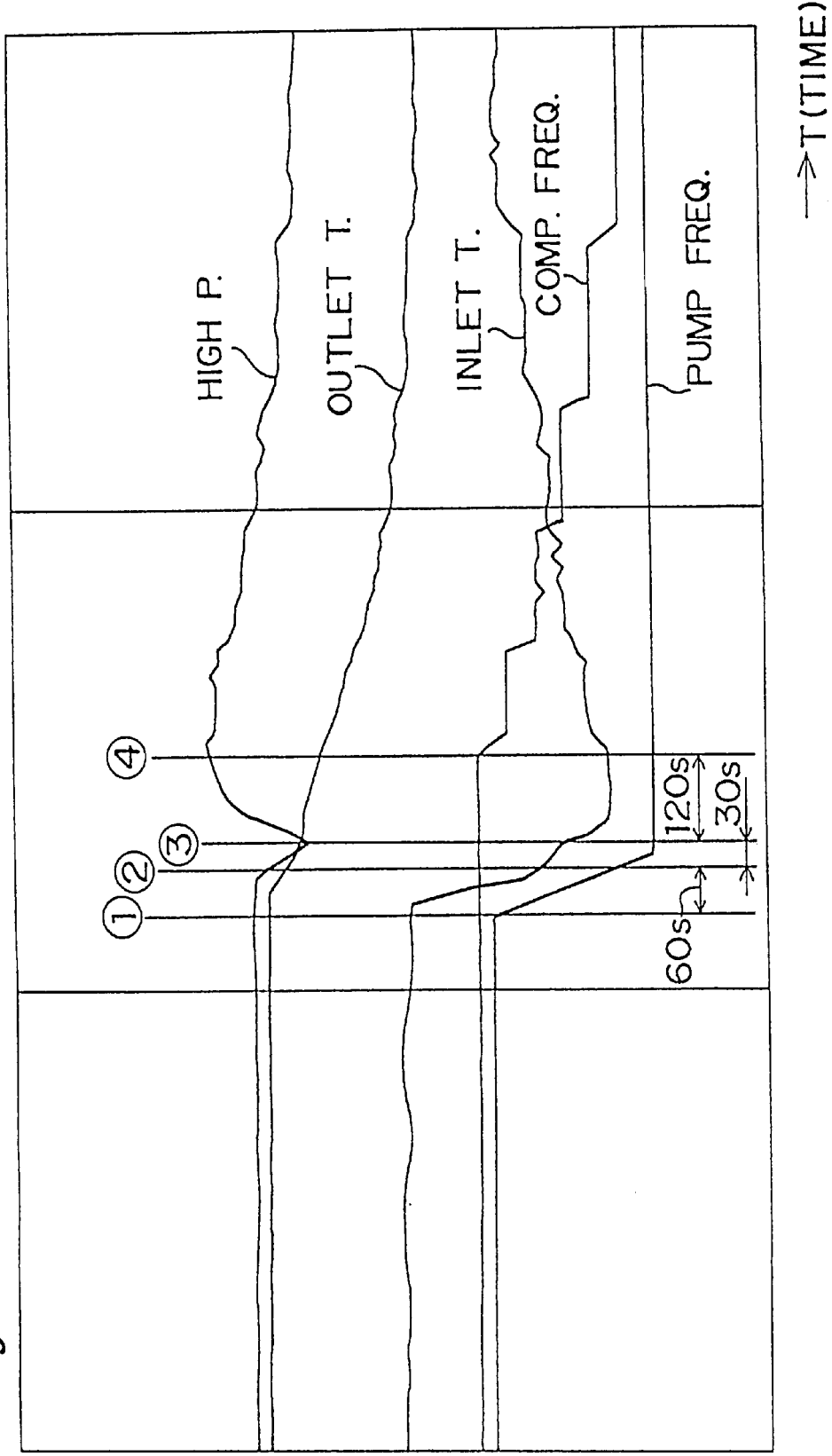
FIG. 15 is a graph showing the changes in various parameters resulting from a significant change in the combustion level of the refrigerant heater when two indoor units are operating, and one indoor unit is then turned off, in the air conditioning system shown in FIG. 1.

Results obtained when both the 2.2 kW and 3.2 kW indoor units were operating, and the 3.2 kW unit was then turned off, are graphed in FIG. 15. The compressor frequency, preferred combustion level (K), and other specific parameters are again shown below.

(1) At time T (1), combustion K changed from K=40 to the maximum combustion level.

(2) At time T (2), the 3.2 kW unit valve opening closed from a 480 to an 80 pulse equivalent.

(3) At time T (3), the 3.2 kW unit turned off.

(4) At time T (4), compressor frequency dropped from 58 Hz to 52 Hz.

While there is a significant change in combustion as a result of decreasing the solenoid pump frequency in this case as shown in FIG. 15, a sudden change in the high pressure, intake temperature and outlet temperature can be prevented by controlling the system components based on the timing chart shown in FIG. 11.

It should be noted that after reducing the compressor frequency at either step S12 in FIG. 8 or step S33 in FIG. 10, the outlet temperature prediction control process described below is implemented to forecast the refrigerant heater 28 outlet temperature.

It should be further noted that refrigerant heater outlet temperature prediction as described below can be used with either multi-room air conditioning systems or stand-alone refrigerant heating type room air conditioners. The following description, however, is based on the multi-room air conditioning system shown in FIG. 1.

Figure 16:
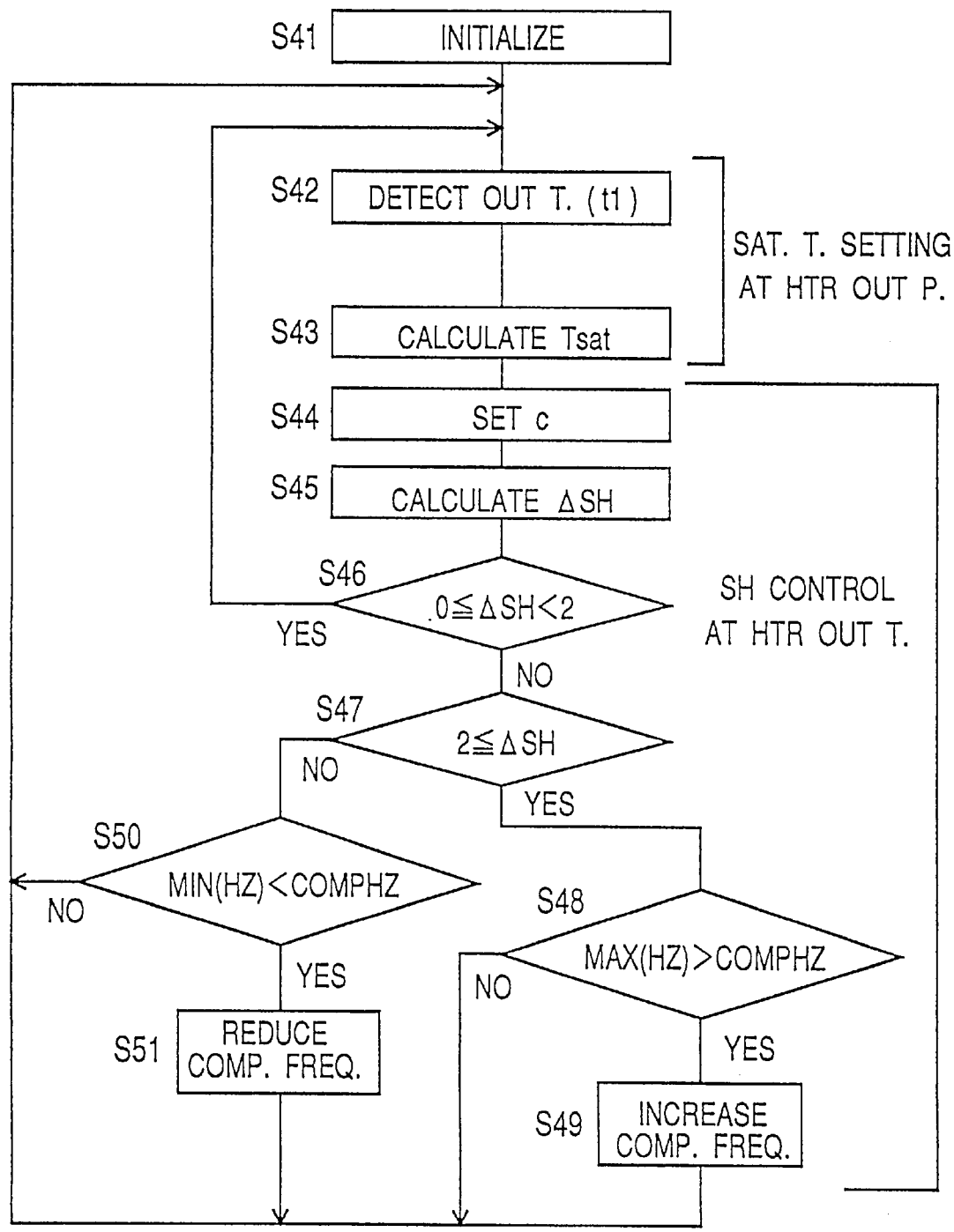
FIG. 16 is a flow chart used to describe refrigerant heater outlet temperature predictive control in the air conditioning system shown in FIG. 1.

FIG. 16 is a flow chart showing the outlet temperature prediction control of the refrigerant heater 28. As shown therein, the prediction control process starts with initializing various parameters (step S41). The temperature of the refrigerant at the outlet side of the compressor 6 is then detected using the compressor outlet temperature sensor 23, which supplies the resulting detection signal to an outlet temperature detection circuit 72. The outlet temperature detection circuit 72 thus detects outlet temperature t1 (step S42).

This outlet temperature t1 is then supplied to a saturation temperature calculator 74, which calculates the saturation temperature Tsat for the outlet pressure of the refrigerant heater 28 using the following equation (step S43).

$$Tsat = a \times t1 + b$$

where a and b are experimental values. Based on conducted experiments, these are set to approximately a=1.54 and b=10.6. It should be noted that the Tsat value determined from the above equation using these values for a and b has been confirmed to be substantially equal to the saturation temperature for the outlet pressure of the refrigerant heater 28.

More specifically, the refrigerant heater outlet temperature in the refrigeration cycle of the refrigerant heating type air conditioners can be calculated if the refrigerant pressure on the high pressure side is known because the outlet pressure is then determined by the pressure loss of the refrigerant lines. The refrigerant heater outlet temperature can thus be controlled by comparing the calculated outlet temperature with the actual detected outlet temperature, and using the temperature difference to control refrigerant heating.

It is therefore necessary to detect the actual refrigerant heater outlet temperature, which is accomplished by the refrigerant heater outlet temperature sensor 33. The detection signal is then input to a refrigerant heater outlet temperature detection circuit 76 whereby the refrigerant heater outlet temperature Tout is detected.

This refrigerant heater outlet temperature Tout and the saturation temperature Tsat are input to a superheating calculator 78. The superheating calculator 78 uses the following equation to calculate $\Delta SH$ (step S45).

$$\Delta SH = Tout - Tsat - c$$

where c is a compensation coefficient set in step S44 for maintaining a predetermined SH value (degree of superheat) at the refrigerant heater outlet temperature and a predetermined SH value at the compressor outlet during low frequency compressor operation. Note that the compensation coefficient c is dependent on the compressor frequency. When the compressor frequency is 25 Hz or greater, c=8, for example. When the compressor frequency is less than 25 Hz, c=10, for example.

The resulting $\Delta SH$ value is then evaluated in decision diamond S46. If $0 \leq \Delta SH < 2$, the procedure loops back to S42. If not, decision diamond S47 determines whether $2 \leq \Delta SH$. If it is, the procedure proceeds to step S48; if not, the procedure branches to S50.

At step S48 the compressor frequency COMPHz is compared with a defined maximum frequency MAX(Hz). If the actual compressor frequency is less than the maximum frequency, the compressor frequency is increased (step S49). If the compressor frequency is already at the maximum frequency, control loops back to step S42.

If $2 \leq \Delta SH$ back in step S47, the compressor frequency COMPHz is compared with a defined minimum frequency MIN(Hz). If the actual compressor frequency is greater than the minimum frequency, the compressor frequency is decreased (step S51). If the compressor frequency is already at the minimum frequency, control loops back to step S42.

Figure 17:
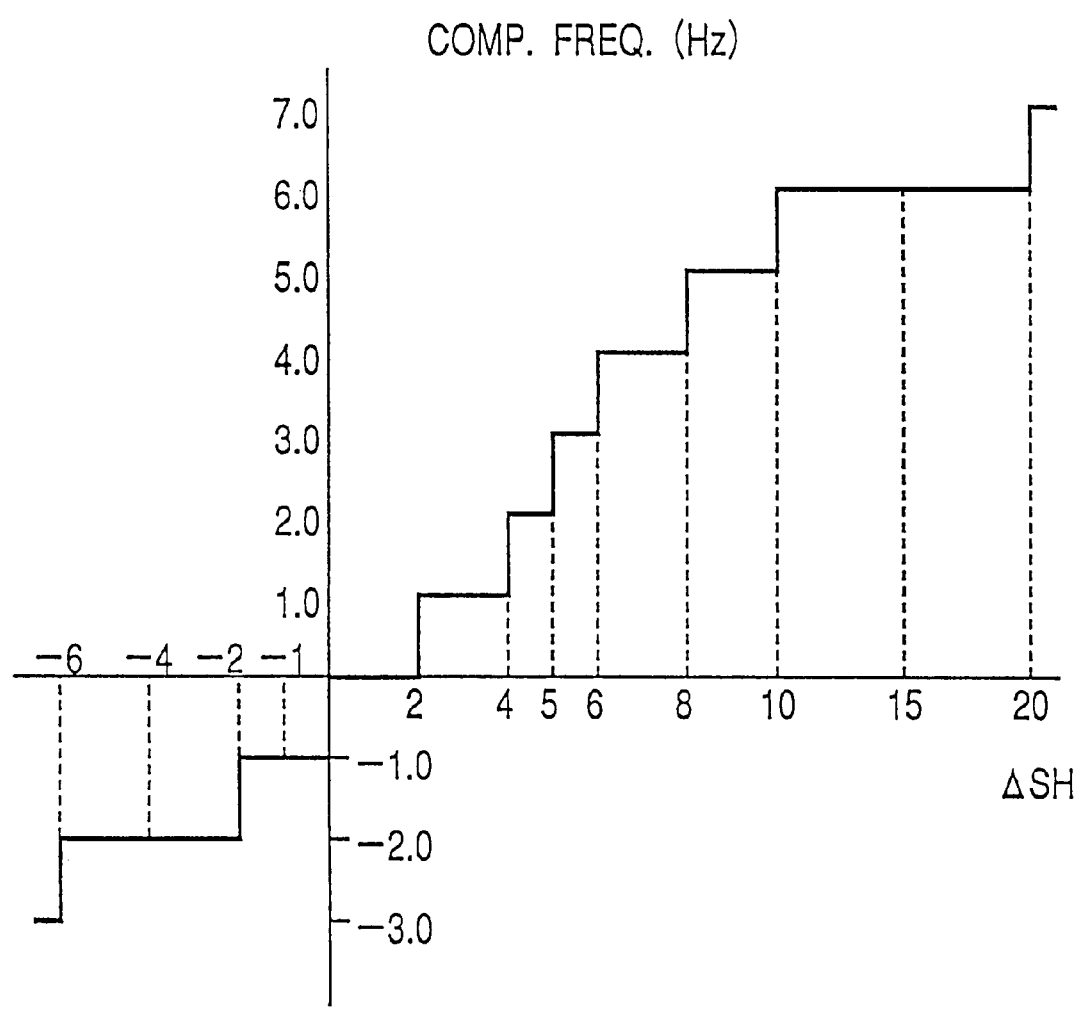
FIG. 17 is a graph showing the relationship between the temperature of superheated refrigerant at the refrigerant heater outlet, and the change effected in the compressor frequency, in the air conditioning system shown in FIG. 1.

FIG. 17 is a graph showing the relationship between $\Delta SH$ and compressor frequency when the compressor frequency is adjusted at step S49 or S51. The same information is also shown in the following Table 5. The change in the compressor frequency is thus determined at step S49 or S51 by a compressor frequency control circuit 82 based on the $\Delta SH$ signal calculated by the superheating calculator 78, and a table 80 of adjustment values shown as Table 5 below. The resulting frequency adjustment signal is then sent to a compressor drive circuit (not shown) for compressor frequency control.

TABLE 5

| $\Delta$ SH | Compressor frequency change |
| --- | --- |
| $20 \leq \Delta$ SH | +7.0 Hz |
| $10 \leq \Delta$ SH $\leq 20$ | +6.0 Hz |
| $8 \leq \Delta$ SH $\leq 10$ | +5.0 Hz |
| $6 \leq \Delta$ SH $\leq 8$ | +4.0 Hz |
| $5 \leq \Delta$ SH $\leq 6$ | +3.0 Hz |
| $4 \leq \Delta$ SH $\leq 5$ | +2.0 Hz |
| $2 \leq \Delta$ SH $\leq 4$ | +1.0 Hz |
| $0 \leq \Delta$ SH $\leq 2$ | ±0 Hz |
| $-2 \leq \Delta$ SH $\leq 0$ | −1.0 Hz |
| $-6 \leq \Delta$ SH $\leq -2$ | −2.0 Hz |
| $\Delta$ SH $\leq -6$ | −3.0 Hz |

The result of the process shown in FIG. 16 is that the compressor frequency is controlled such that $\Delta SH$ approaches zero, that is, superheating of the refrigerant gas at the refrigerant heater outlet approaches the value of the compensation coefficient c above.

If refrigerant superheating calculated by the superheating calculator 78 (see FIG. 17 and Table 5) is greater than a predetermined setting, the compressor frequency is increased in steps relative to the rise in refrigerant superheating. If refrigerant superheating is less than a predetermined setting, the compressor frequency is similarly decreased in steps relative to the drop in refrigerant superheating. Note that the average slope of the compressor frequency drop is more gradual than the average slope of the compressor frequency rise.

By thus controlling the compressor frequency, the compressor frequency can be significantly increased and an abnormal rise in the refrigerant heater outlet temperature can be quickly suppressed when refrigerant superheating at the refrigerant heater outlet is excessively high. When superheating is below a predefined setting, the compressor frequency can be greatly lowered to prevent fluid return to the compressor from the refrigerant heater. Note that the compressor frequency must be gradually lowered because a sudden drop in the compressor frequency can lead to an abnormal rise in the refrigerant heater outlet temperature.

The relationship between refrigerant superheating at the refrigerant heater outlet and the change in compressor frequency is controlled such that the slope of the average decrease is more gradual than the slope of the average increase in the compressor frequency, thereby preventing an abnormal rise in the refrigerant heater temperature when the compressor frequency is lowered.

Note that the maximum increase in the compressor frequency is set to 7 Hz. This is because the compressor frequency increase is related to a rise in the input. By limiting the increase in the compressor frequency, a rise in the input can be suppressed and efficient operation can be achieved. This is particularly important when a refrigerant leak occurs. More specifically, the refrigerant outlet temperature can rise easily when refrigerant leaks because refrigerant circulation decreases, and the temperature of the superheated refrigerant at the refrigerant heater outlet thus rises. This can be controlled by increasing the compressor frequency, but if the compressor frequency is increased too much, an abnormal rise in the input can occur.

While not shown in the flow chart in FIG. 16, a minimum compressor frequency limit is also set according to the refrigerant outlet temperature of the compressor. More specifically, the minimum compressor frequency is set to 38 Hz when the refrigerant outlet temperature at the compressor is 40° C. or less with two indoor units operating in a multi-room air conditioning system. With a single room air conditioner or with only one indoor unit operating in a multi-room air conditioning system, the minimum compressor frequency is set to 35 Hz when the refrigerant outlet temperature at the compressor is 45° C. or greater.

When refrigerant superheating at the refrigerant heater outlet is controlled to a specific value by reducing the compressor frequency, refrigerant circulation drops excessively when the compressor frequency drops below a certain point. When the fan speed of the indoor unit is then changed, refrigerant circulation can change significantly due to a high pressure change. In certain cases it is not possible to compensate for this change in refrigerant circulation, and the refrigerant heater outlet temperature can rise abnormally. However, by setting a minimum frequency to which the compressor frequency can be lowered, circulation changes resulting from changes in indoor unit operation can be accommodated.

When the refrigerant charge to the air conditioning system is high, the refrigeration cycle becomes wet and the superheating at the refrigerant heater outlet drops. Compressor frequency reduction control thus begins, but if the compressor frequency is lowered excessively, refrigerant circulation also drops excessively, and a change in the indoor unit blower speed (high pressure change) cannot be accommodated. This is because a change in the high pressure side results directly in a change in the low pressure side, and refrigerant circulation is greatly affected by a change in the high pressure level, because no flow restrictor is provided in the refrigeration cycle of the refrigerant heating system.

It should be noted that the temperature of refrigerant from the compressor 6 is detected by the outlet temperature sensor 23 in an air conditioning system configured as described above, but the outlet temperature sensor 23 can be alternatively replaced by an outlet pressure sensor 84.

Figure 18:
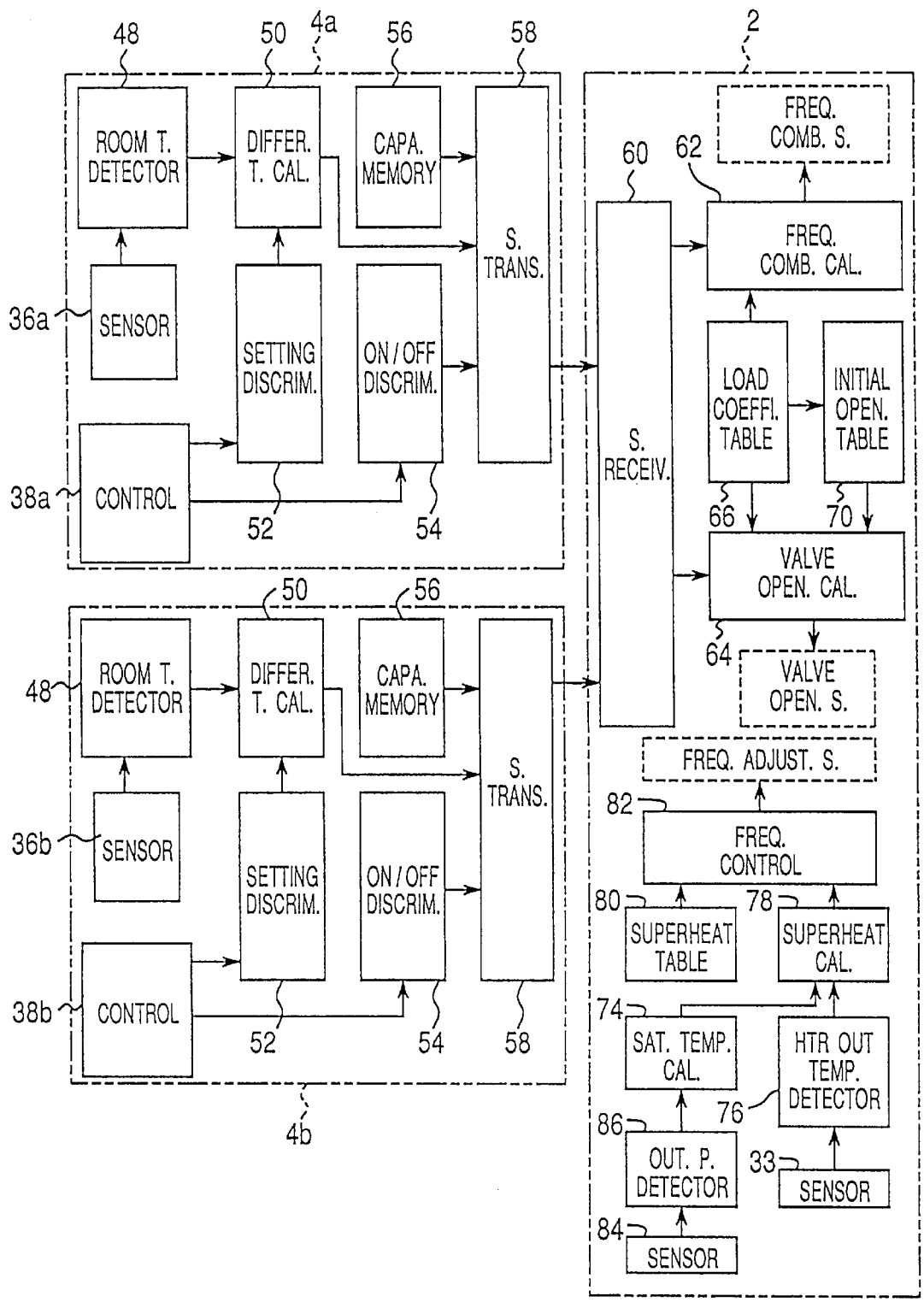
FIG. 18 is a block diagram of an alternative version of the control circuit shown in FIG. 2.

FIG. 18 is a block diagram of an air conditioning system including an outlet pressure sensor 84 in place of an outlet temperature sensor 23.

As will be known from FIG. 18, the pressure of refrigerant output from the compressor 6 is sensed by an outlet pressure sensor 84, and the resulting pressure signal is applied to an outlet pressure detection circuit 86 whereby the pressure is detected. As described above, if the refrigerant pressure on the high pressure side is known, the refrigerant heater outlet pressure is determined by the pressure loss of the refrigerant lines. As a result, the saturation temperature at the refrigerant heater outlet pressure can be predicted by substituting the detected outlet pressure into a known equation.

It will also be obvious to those skilled in the art that while the preferred embodiment of the invention as described above has two indoor units connected to one outdoor unit in a multi-room air conditioning system, the number of indoor units shall not be limited to two, and substantially the same control method can be applied whether there are two, three, or more indoor units.

It will also be obvious as described above that predictive control of the refrigerant heater outlet temperature can also be applied to a refrigerant heating type single-room air conditioning system.

Comprised as described above, an air conditioning system according to the present invention offers the following benefits and advantages.

Refrigerant superheating at the refrigerant heater outlet is calculated based on an output of the refrigerant heater outlet temperature detection means and an output of the saturation temperature calculating means. The compressor frequency is then adjusted so that the calculated superheating reaches a specific value. It is therefore possible to efficiently control the refrigerant heater outlet temperature by directly adjusting refrigerant circulation according to the refrigerant heater outlet temperature.

When refrigerant heating exceeds the heat dissipation of refrigerant circulation, refrigerant circulation is increased by increasing the compressor frequency. An abnormal rise in temperature of the compressor and compressor damage resulting from an abnormal rise in the refrigerant heater outlet temperature can thus be prevented. Furthermore, when refrigerant circulation exceeds the heating capacity of the refrigerant heater, refrigerant circulation is decreased by decreasing the compressor frequency. Damage to the compressor resulting from fluid return to the compressor, and corrosion of the aluminum housing due to condensation in the refrigerant heater resulting from a drop in the refrigerant heater outlet temperature, can thus be prevented.

It should also be noted that because a bypass valve and a bypass line from the compressor to the refrigerant heater are not provided, 100% of refrigerant heater combustion is available to the indoor unit as heat for room heating. The air conditioning system can also operate more efficiently because the balance between refrigerant circulation and heating is not disturbed.

In an alternative version of the invention, the saturation temperature calculating means includes a means for detecting the temperature of refrigerant delivered from the compressor, or a means for detecting the refrigerant pressure output from the compressor.

If the refrigerant temperature is detected, the saturation temperature calculating means predictively calculates the saturation temperature at the refrigerant heater outlet pressure by substituting the detected temperature into a specific equation. In this case, the refrigerant heater outlet temperature can be controlled using, for example, a low cost compressor outlet temperature sensor and refrigerant heater outlet temperature sensor.

If the refrigerant pressure is detected, the saturation temperature calculating means predictively calculates the saturation temperature at the refrigerant heater outlet pressure by substituting the detected pressure into a specific equation. In this case, the high pressure saturation temperature is detected by a high pressure sensor, thereby enabling accurate detection of the saturation temperature and faster response.

In any of the above configurations, the compressor frequency is preferably increased in steps as the degree of superheating rises when the refrigerant superheating calculated by the refrigerant superheating calculating means exceeds a predetermined value. If the calculated refrigerant superheating is less than the predetermined value, the compressor frequency is decreased in steps as the degree of superheating drops. In both cases, refrigerant superheating can be rapidly adjusted to a specific value, and high efficiency operation can be achieved.

Additionally, the compressor frequency change is controlled such that the average slope of a compressor frequency decrease is less than the average slope of a compressor frequency increase. It is therefore possible to rapidly restore high efficiency operation, prevent a drop in refrigerant circulation, and thus prevent overheating of the refrigerant heater.

Further preferably, a maximum frequency change is defined for any increase in the compressor frequency. An increase in the input to the compressor can thus be suppressed, low input level operation can be achieved, and an abnormally high temperature load on the compressor resulting from a high refrigerant heater outlet temperature can be avoided.

Additionally or alternatively, a minimum compressor frequency is also defined and determined by the refrigerant temperature from the compressor. As a result, when a high pressure change (refrigerant circulation change) occurs as a result of a change in the room environment, for example, a change in the blower output of the indoor unit, the refrigerant heater outlet temperature can be maintained at a normal temperature level, and fluid return to the compressor can be avoided.

The present invention further provides a method for controlling the refrigerant heater outlet temperature in an air conditioning system as described above. This control method calculates a saturation temperature at a refrigerant heater outlet pressure; detects a refrigerant heater outlet temperature; calculates refrigerant superheating at a refrigerant heater outlet based on the calculated saturation temperature and the detected refrigerant heater outlet temperature; and adjusts the compressor frequency such that the calculated refrigerant superheating becomes a specific value.

It is therefore possible to efficiently control the refrigerant heater outlet temperature by directly adjusting refrigerant circulation according to the refrigerant heater outlet temperature.

The saturation temperature calculating step of the above method preferably detects the temperature of refrigerant delivered from the compressor, and predictively calculates the saturation temperature at the refrigerant heater outlet pressure by substituting the detected temperature into a specific equation. In this case, the refrigerant heater outlet temperature can be controlled using, for example, a low cost compressor outlet temperature sensor and refrigerant heater outlet temperature sensor.

Alternatively, the saturation temperature calculating step detects a pressure of refrigerant output from the compressor, and predictively calculates the saturation temperature at the refrigerant heater outlet pressure by substituting the detected refrigerant pressure into a specific equation. In this case, the high pressure saturation temperature is detected by a high pressure sensor, thereby enabling accurate detection of the saturation temperature and faster response.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An air conditioning system comprising:
   one outdoor unit having a variable capacity compressor, a four-way valve, an outdoor heat exchanger, and a refrigerant heater;
   at least one indoor unit connected to said outdoor unit by means of a refrigerant line and having an indoor heat exchanger;
   a saturation temperature calculating means for calculating a saturation temperature at a refrigerant heater outlet pressure;
   a refrigerant heater outlet temperature detection means for detecting an outlet temperature of said refrigerant heater;
   a refrigerant superheating calculating means for calculating refrigerant superheating at a refrigerant heater outlet based on an output of said refrigerant heater outlet temperature detection means and an output of said saturation temperature calculating means; and
   a compressor frequency adjustment means for adjusting a compressor frequency such that the refrigerant superheating calculated by said refrigerant superheating calculating means becomes a predetermined value.

2. The air conditioning system according to claim 1, wherein said saturation temperature calculating means comprises a compressor outlet temperature detection means for detecting a temperature of refrigerant output from said compressor, and predictively calculates the saturation temperature at the refrigerant heater outlet pressure by substituting the temperature detected by said compressor outlet temperature detection means into a specific equation.

3. The air conditioning system according to claim 1, wherein the saturation temperature calculating means comprises a compressor outlet pressure detection means for detecting a refrigerant pressure output from the compressor, and predictively calculates the saturation temperature at the refrigerant heater outlet pressure by substituting the refrigerant pressure detected by said compressor outlet pressure detection means into a specific equation.

4. The air conditioning system according to claim 1, wherein the compressor frequency is increased in steps as a degree of superheating rises when the refrigerant superheating calculated by said refrigerant superheating calculating means exceeds the predetermined value, wherein the compressor frequency is decreased in steps as the degree of superheating drops when the calculated refrigerant superheating is less than the predetermined value, and wherein the compressor frequency change is controlled such that an average slope of a compressor frequency decrease is less than an average slope of a compressor frequency increase.

5. The air conditioning system according to claim 1, wherein a maximum frequency change is defined for any increase in the compressor frequency.

6. The air conditioning system according to claim 1, wherein a minimum compressor frequency is defined and determined by the temperature of refrigerant output from said compressor.

7. A control method for a refrigerant heater outlet temperature in an air conditioning system having one outdoor unit and at least one indoor unit connected to each other by means of a refrigerant line, said outdoor unit having a variable capacity compressor, a four-way valve, an outdoor heat exchanger, and a refrigerant heater, said indoor unit having an indoor heat exchanger, said control method comprising the steps of:

calculating a saturation temperature at a refrigerant heater outlet pressure;

detecting a refrigerant heater outlet temperature;

calculating refrigerant superheating at a refrigerant heater outlet based on the calculated saturation temperature and the detected refrigerant heater outlet temperature; and adjusting a compressor frequency such that the calculated refrigerant superheating becomes a predetermined value.

8. The control method according to claim 7, wherein the step of calculating the saturation temperature comprises detecting a temperature of refrigerant output from the compressor, and predictively calculating the saturation temperature at the refrigerant heater outlet pressure by substituting the detected temperature into a specific equation.

9. The control method according to claim 7, wherein the step of calculating the saturation temperature comprises detecting a pressure of refrigerant output from the compressor, and predictively calculating the saturation temperature at the refrigerant heater outlet pressure by substituting the detected refrigerant pressure into a specific equation.

* * * * *